(12) United States Patent
Zarins et al.

(10) Patent No.: US 11,921,804 B2
(45) Date of Patent: *Mar. 5, 2024

(54) DATA VISUALIZATION IMPLEMENTATION

(71) Applicant: Data Visualization Software Lab, Riga (LV)

(72) Inventors: Viesturs Zarins, Ikskile (LV); Gints Ernestsons, Riga (LV); Janis Volbergs, Riga (LV); Edgars Smirnovs, Tilderi (LV)

(73) Assignee: Data Visualization Software Lab, Riga (LV)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,239

(22) Filed: Mar. 17, 2023

(65) Prior Publication Data

US 2023/0230301 A1 Jul. 20, 2023

Related U.S. Application Data

(63) Continuation of application No. 15/702,982, filed on Sep. 13, 2017, now Pat. No. 11,645,343, which is a
(Continued)

(51) Int. Cl.
*G06F 16/20* (2019.01)
*G06F 16/2455* (2019.01)
(Continued)

(52) U.S. Cl.
CPC .... *G06F 16/9535* (2019.01); *G06F 16/24552* (2019.01); *G06F 16/986* (2019.01); *G06T 11/206* (2013.01)

(58) Field of Classification Search
CPC .................................. G06F 16/24552
See application file for complete search history.

(56) References Cited

U.S. PATENT DOCUMENTS

| 11,645,343 B2 | 5/2023 | Zarins et al. |
| 2011/0184936 A1* | 7/2011 | Lymberopoulos ......... G06F 16/9574 707/E17.014 |

(Continued)

FOREIGN PATENT DOCUMENTS

| JP | 2018-514884 A | 6/2018 |
| WO | 2016/147052 A1 | 9/2016 |

OTHER PUBLICATIONS

International Search Report and Written Opinion received for PCT Patent Application No. PCT/IB2016/000414, dated Jun. 23, 2016, 8 pages.
(Continued)

*Primary Examiner* — Kristopher Andersen
(74) *Attorney, Agent, or Firm* — DLA Piper LLP (US)

(57) ABSTRACT

Systems, methods, and non-transitory computer readable media with instructions for methods here may be used to create and render interactive charts using large amounts of data, by efficiently dividing up the storage and processing of the data between a networked side and a local application side. In certain example embodiments, these two sides work in conjunction with one another, alternatively or additionally, in certain example embodiments, they may act independently and/or alone. The resulting charts may then be used by being embedded in external web pages.

13 Claims, 26 Drawing Sheets

Related U.S. Application Data continuation of application No. PCT/IB2016/000414, filed on Mar. 14, 2016.

(60) Provisional application No. 62/133,183, filed on Mar. 13, 2015.

(51) Int. Cl.
*G06F 16/9535* (2019.01)
*G06F 16/958* (2019.01)
*G06F 16/90* (2019.01)
*G06T 11/20* (2006.01)

(56) References Cited

U.S. PATENT DOCUMENTS

| | | | | |
|---|---|---|---|---|
| 2011/0264650 A1* | 10/2011 | Tobin | ............... | G06F 16/248 707/E17.014 |
| 2015/0040052 A1* | 2/2015 | Noel | ............... | G06F 3/04847 715/771 |
| 2015/0355790 A1 | 12/2015 | O'Mahony et al. | | |
| 2015/0373034 A1 | 12/2015 | Seshadri et al. | | |
| 2016/0231900 A1* | 8/2016 | Meaney | ............... | G06F 3/0482 |
| 2016/0239581 A1 | 8/2016 | Jaidka et al. | | |

OTHER PUBLICATIONS

International Preliminary Report on Patentability for PCT Patent Application No. PCT/IB2016/000414, dated Sep. 28, 2017, 8 pages.

Keller, A.M., et al., "A predicate-based caching scheme for client-server database architectures", The VLDB Journal, vol. 5, No. 1, Jan. 1, 1996, pp. 35-47.

Clark, J., "Multi-level Pie Charts," Mar. 3, 2012, retrieved from the internet: https://web.archive.org/web/20120303051301/https://www.neoformix.com/2006/MultiLevelPieChart.html (Year: 2012).

* cited by examiner

600

DATA VISUALIZATION IMPLEMENTATION

CROSS REFERENCE TO RELATED CASES

This application claims priority from and is a continuation of U.S. patent application Ser. No. 15/702,982 filed on Sep. 13, 2017, which in turn claims priority from and is a continuation of international PCT Application No. PCT/IB2016/000414 filed on Mar. 14, 2016, which in turn claims priority from U.S. Provisional Patent Application No. 62/133,183 filed on Mar. 13, 2015, all of which are incorporated herein by reference in their entireties.

TECHNICAL FIELD

This application relates to the field of networked computers and creation of interactive charts added to computer applications and/or websites.

BACKGROUND

Previously, it was difficult for developers to add charts to software applications that had features capable of interaction. Data is now being captured and created at never before seen rates. The amount of data collected every day in today's computing world equates to years of data collected just a few decades ago. This data is being used in analytics and decision making in almost every modern industry. But analyzing large amounts of data and turning the data into digestible forms for human consumption can pose a challenge. Further, displaying such amounts of data in digestible formats is difficult. Often too much data gets distracting for users and they find no logical way to interact with and display layers of data to digest.

SUMMARY

The examples disclosed here include methods and systems for adding charts to software applications. Systems and methods of managing data, include at a server in communication with a network and a data storage, receiving data, causing the data to be stored in the data storage, receiving a request over the network, from an application on a mobile device, the request being for certain of the data to be used to display a chart, determining a subset of the requested data to send to the application over the network, sending the subset of the requested data to the application over the network, receiving a request for data related to the sent data from the application over the network, determining a subset of the requested related data to send to the application over the network, sending the subset of the requested related data to the application over the network. Alternatively or additionally, the determining a subset of the requested data step includes data aggregation. Alternatively or additionally, the determining a subset of the requested data step includes filtering. Alternatively or additionally, the determining a subset of the requested data step includes sub-view filtering. Alternatively or additionally, the chart is one of, a time chart, a network chart, a pie chart, a facet chart, a geography chart, or an event chart. Alternatively or additionally, data aggregation includes, extracting distinct values for a selected field of data; and creating an aggregate item for each distinct field. Alternatively or additionally, filtering includes using filtering criteria to determine which data to include in the subset of data to send to the application over the network. Alternatively or additionally, sub-view filtering includes selecting a subset of the overall data available for use in a chart.

Systems and methods of managing data, include at an application running on a mobile device, the application in communication with a network and a data storage, receiving a request from a user to chart data, sending a request to a networked server over the network, for data to be used to render the chart, receiving a subset of the requested data, causing storage of the subset of requested data on the data storage, using the stored subset of requested data to render a chart for display on the mobile device, receiving input from the user regarding the rendered chart, sending a request to the networked server for data related to the stored subset of requested data, receiving a subset of the requested related data, causing storage of the received subset of the requested related data, using the stored received subset of the requested related data to alter the rendered chart. Alternatively or additionally, the chart is one of, a time chart, net chart, pie chart, facet chart, geo chart, or event chart. Alternatively or additionally, the application further causes visual hints to be displayed for the user to interact with, the visual hints include graphical indications of data which may be displayed upon interaction with the mobile device. Alternatively or additionally, the rendered chart is interacted with by a user on the mobile device, queuing chart changes as they are received, and deferring updating the chart until a preselected time before the chart is rendered. Alternatively or additionally, the input received from the user causes the application to request more data from the network server. Alternatively or additionally, using filters from a library stored on the data storage, on received data for reducing the amount of data to be render in the chart. Alternatively or additionally, sending a query to the networked server at time intervals for new data or updates of existing data. Alternatively or additionally, the application receives the more data from the network server and uses the more data to cause display of an altered chart. Alternatively or additionally, the chart is a pie chart and the visual hint includes a summarized chart rendered in the middle of the pie chart; and wherein a highlight hint for a pie slice in the middle pie is rendered.

Non-transitory computer-readable medium having computer-executable instructions thereon for a method of managing data, the instructions comprising, at an application running on a mobile device, the application in communication with a network and a data storage, receiving a request from a user to chart data, sending a request to a networked server for data to be used to render the chart, receiving a subset of the requested data, causing storage of the subset of requested data on the data storage, using the stored subset of requested data to render a chart for display on the mobile device, receiving input from the user regarding the rendered chart, sending a request to the networked server for data related to the stored subset of requested data, receiving a subset of the requested related data, causing storage of the received subset of the requested related data, using the stored received subset of the requested related data to alter the rendered chart. Alternatively or additionally, the input received from the user causes the application to request more data from the network server. Alternatively or additionally, the instruction further comprise, using filters from a locally stored library on received data for reducing the amount of data to be render the chart. Alternatively or additionally, the instruction further comprise, sending a query to the networked server at time intervals for new data or updates of existing data. Alternatively or additionally, the chart is a time chart and the application further changes a time range on the time chart in reaction to horizontal swiping user input. Alternatively or additionally, the application renders a combination pie chart and network chart in response to user input.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

In certain examples, the systems and methods disclosed here may be useful for analyzing data, charting data and representing the charted data visually for output into human digestible forms. Certain kinds of forms may include but are not limited to slide presentations, document reports, spreadsheets, or any other kind of visual display. Consumers may then find these visual manifestations of their data useful in a web page and/or mobile application implementation.

Systems and methods here may be used to create and render interactive charts using large amounts of data, by efficiently dividing up the storage and processing of the data between a networked side and a local application side. In certain example embodiments, these two sides work in conjunction with one another, alternatively or additionally, in certain example embodiments, they may act independently and/or alone. The resulting charts may then be used by being embedded in external web pages.

Many different kinds of charts are disclosed herein, including but not limited to Time Charts, Net Charts, Pie Charts, Facet Chart, Event Chart and Geo Chart (Geographic). Each chart may be used in a particular situation, to best visualize data for users. These charts are discussed below, along with systems and methods for turning big data into manageable data.

Figure 1:
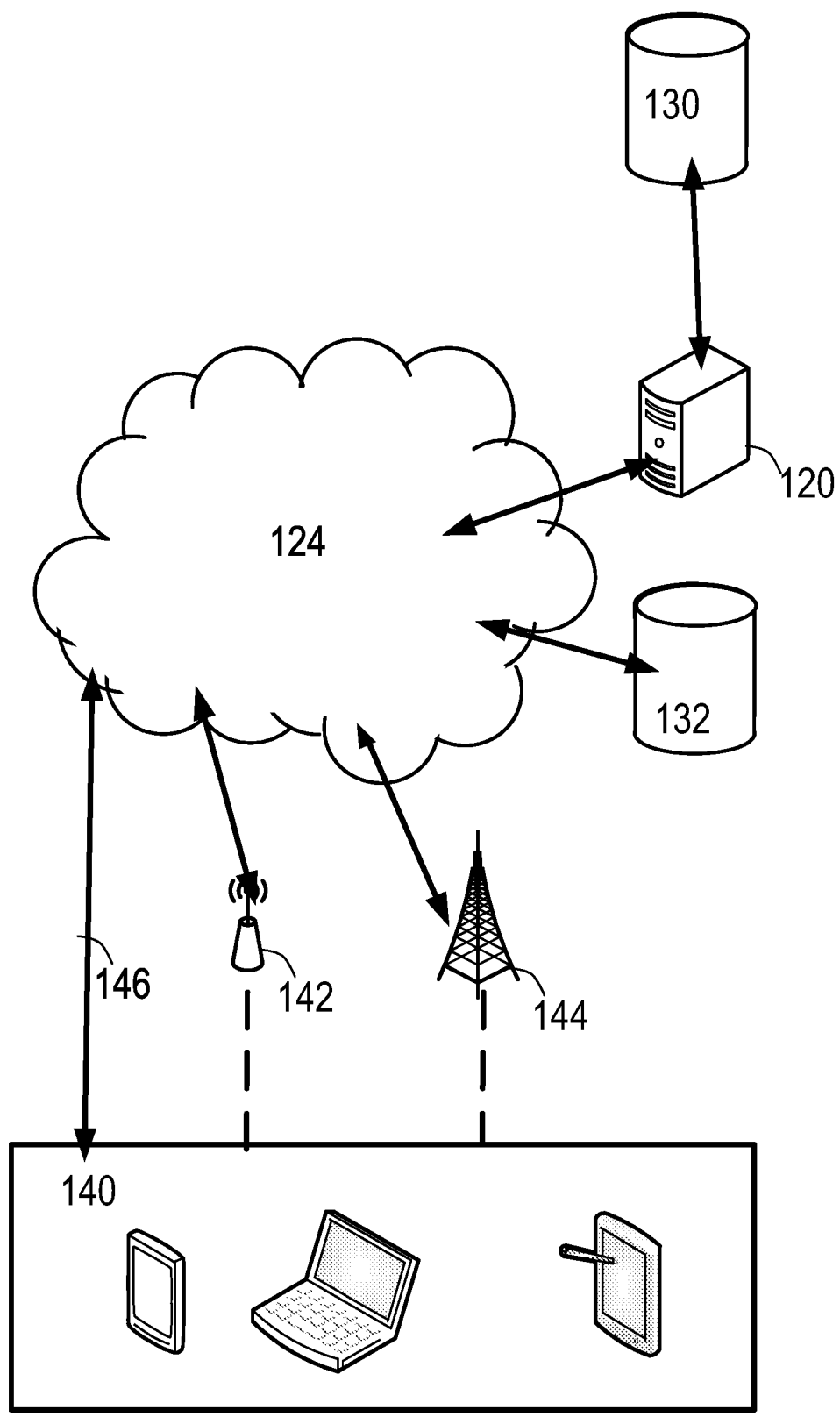
FIG. 1 is an example network diagram according to examples herein.

FIG. 1 is a network diagram showing an example system network which could be used to practice the methods described here. In the example, a back end server, or servers, 120 are in communication with a network 124. The back end server 120 is also in communication with a data storage either locally 130 or networked storage 132 via the network 124. The network 124 also allows communication from the back end server 120 to any of various mobile devices 140 via any kind of wireless communications systems such as an internet service provider/mobile subscriber network, etc. utilizing wireless radios such as a WiFi hotspot 142 and/or cellular towers 144 or any other way of wirelessly communicating. Wired networks 146 may also be used for non-mobile computing systems.

As will be described below, the systems and methods here may allow for data to be stored on the back end systems 130, 132 and also locally on the mobile devices themselves 140 through the application run on the client side mobile device. By so doing, the back end system 120 is able to allocate which data to store where in order to facilitate recall of commonly used data.

It should be noted that client computers and mobile devices in this disclosure may include any kind of computing device including portable computing devices. Mobile devices are devices that have been designed to be used in many locations, contain at least CPU, RAM, display and storage and/or network connectivity. Examples include but are not limited to smartphones, tablets, phablets, laptops, wearables such as glasses, watches, bracelets, headsets, automobile integrated systems, etc. Any kind of portable computing device may be used. This includes mobile devices that transmit and receive wirelessly over any kind of network such as cellular networks, WiFi networks, picocell networks, Bluetooth, near field communication, satellite, or any other kind of wireless communications.

Data Storage and Processing: Server and Local

Data processing includes everything from receiving a data chunk from a server all the way until that data is passed to a display engine for rendering on a computer screen. The processing and storage of such data either at the server side or at the mobile client side may have real consequences as to the performance of the software and how efficiently and/or quickly such data may be analyzed, computed and ultimately displayed in chart format. Thus, systems and methods here may be used to determine where and how to store and process data in subset units instead of dealing with large amounts of data as one unit.

The back end server may have more overall available data storage and even processing power than a local computer that is either a mobile or wired client device. But accessing the server stored data and processing power may actually be less efficient and slower than utilizing a local data cache that is a subset of the server's data storage. Even using local processors may be more efficient than utilizing the networked server. It is the balance and trade-offs of this data sharing that is the subject of the systems and methods here.

Data Loading

As described in the above scenarios, to deal with large amounts of data, the networked system may determine that certain amounts of the data should be downloaded from the networked server and storage to the local system. Such data may be loaded into the local system initially or may be loaded incrementally and/or on-demand. When a chart view is updated or the user interacts with the chart, the system may determine what data is needed and performs the requests to the networked server. The data request may contain parameters to limit the data scope so that the response can be generated quickly and extra data is not sent unnecessarily.

For example, the time chart may have the following limit parameters: fromTimestamp, toTimestamp and aggregationUnit. Each data item to be shown in time chart may have a timestamp field containing a Unix timestamp in seconds or milliseconds. The aggregationUnit may specify the granularity of the returned data with possible values of: year, month, week, day, hour, minute, second, millisecond and others. The database server may use the limit parameters to construct an appropriate database query that returns only the needed data. Pie chart and facet chart have the following: drilldownId, offset and limit.

If a large amount of data is needed, it may be useful to perform several subsequent or parallel data requests, each for a subsection of the needed data. The existing parameters can be used for creating the subsections. Such splitting up of the requests may improve the responsiveness of the chart because the data needed most relevantly is locally stored.

Data Cache

To minimize data requests, received data can be temporarily stored in a chart cache on the application side, which may use Random Access Memory (RAM) of the mobile device or client computer. Such data may be organized along the same limit parameters that are used for server requests so when data is needed for rendering, the system may compare the view limits with cached data limits to determine if the cache already has all needed data. If the cache has only a partial set of the data, the data request to server can be trimmed down to request only the missing parts, thus saving time and processing power.

Data Usage

Alternatively or additionally, another feature utilized by the systems and methods here is to build many charts from the same data set for visualization in different ways. For example if the data items have both a timestamp field and geographic coordinate. For example a news feed containing news items, each item has a publish date and a geographic location. The application developer may generate a list of items in a specified data format. The publish date may be converted into a Unix timestamp format and the location into a geographic coordinate pair. Alternatively or additionally an application may be created with timechart and geochart displayed side by side showing two views of the same data.

Data Updates

Alternatively or additionally another feature is to display data and update that data to be displayed in the chart periodically. This may be useful for monitoring data as it becomes available. Systems and methods here may implement this feature by repeatedly querying the server at particular intervals for new data or simply updating existing data.

Simply requesting all the visible range from the server may stress the system server and network bandwidth. To rectify this issue, systems and methods here using the proprietary library may add limits to the request. The limits may span from a particular timestamp in cache to a current timestamp. This may result in a very small request, usually spanning no more than a few seconds. It may be useful to actually refresh data for the last time unit in the cache because the server might be aggregating the data and might have received new data in the last period.

Another real-time issue may be that data is not available up to the current time timestamp. This may be addressed by forming request limits to start from a timestamp of the latest data received in previous requests. This way it is acceptable that the server does not return data up to last second and has the opportunity to return it later during another request.

Alternatively or additionally, multiple chart methods can be used to update a particular chart with real-time data. In one update example, the system periodically issues a data request to the server for a chart. This method does not need any server modifications. Queries are performed using the same request method as for base data loading. Such requests may be at any rate including but not limited to every second, every half-second, every two seconds, etc.

Alternatively or additionally, other ways to update a chart may be to instruct the server send new data as it becomes available. This can be done over either WebSockets or WebRTC link or other technology that allows server-initiated communication. Using this method, the system may process new data items for a chart as they are received, and add the new data items to the cache. This may initiate a display update for a chart.

Linked Charts

In some example embodiments, alternatively or additionally, charts may be linked to one another and the data used by one may be shared with another. Linked charts may also share parameters such as an amount of time reflected in the data. In such examples, the linked chart parameters may act as filters for the data, restricting the kind and/or characteristics for the data to be displayed.

Figure 2:
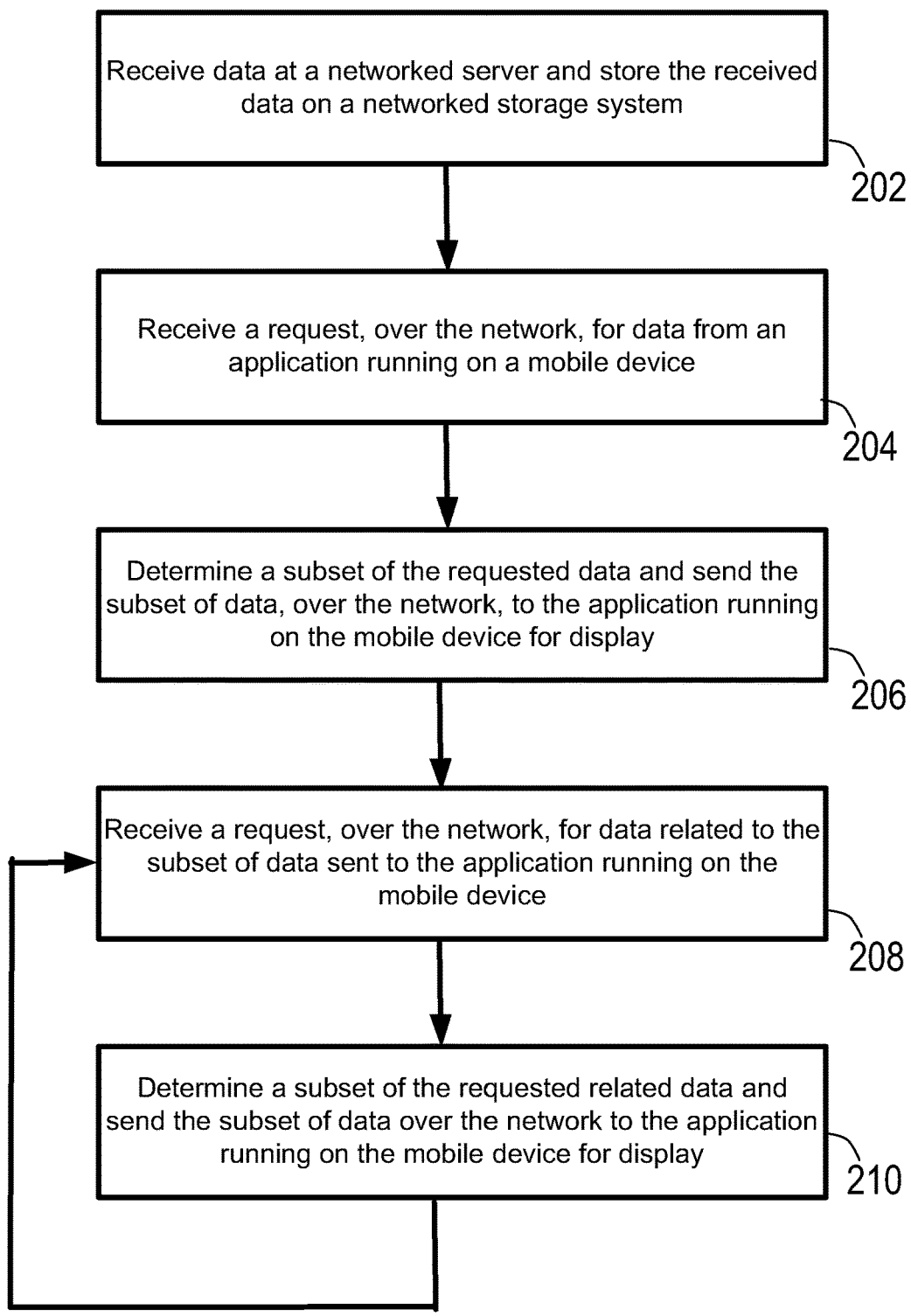
FIG. 2 is an example flow chart from a networked server point of view according to certain examples described herein.

FIG. 2 is a flow chart describing an example data request scenario from the perspective of the back end networked servers. First, 202, the servers receive and cause storage of data to be used for charting. Next, 204 the server receives a request from a mobile application running on a mobile device. The request is for data to be charted by the mobile application. Next, 206 the server determines that only a subset of the requested data needs to be sent to the application for charting. This determination may include many variables and take different forms as described in more detail below. Next, 208, the server receives a subsequent request for data related to the first sent data, from the application over the network. This request may be generated in response to a user interaction with the application, and the need for more data to be revealed in the chart by the application. Finally, 210, the server may determine a subset of the requested related data be sent to the application over the internet, to service the request and allow the application to augment the chart or cause display of other data as needed. The last two steps 208, 210 may be repeated as necessary as the user interacts with the charts and the applications.

Figure 3:
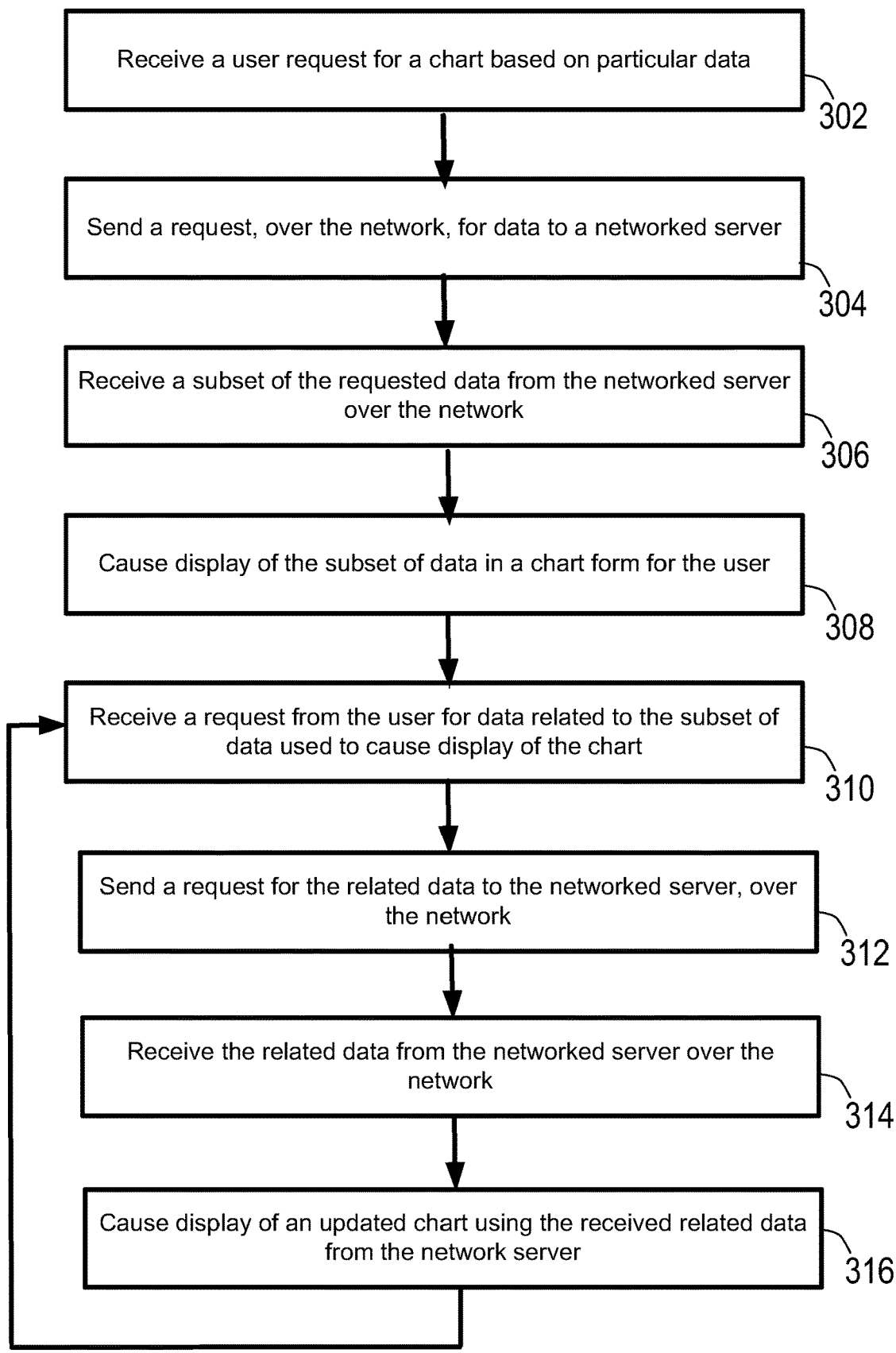
FIG. 3 is another example flow chart from an application running on a mobile device according to certain examples described herein.

FIG. 3 is a flow chart describing an example data request scenario from the perspective of an application running on a mobile device or a client computer of some type. First, the application receives a user request to chart particular data 302. Next, 304, the application sends a request over the network to a networked server, for the data needed for the chart. Next, 306 the application receives from networked server, a subset of the data needed to create the chart for the use. The decision of what is contained in the subset may be based on a number of variables as described herein. Next, 308 the application may use the subset of data to create and/or render a chart for the user. Next, 310 the application may receive a request from the user for some data related to the data used to render the chart. This request may be through an interaction the user has with the mobile device and application, to explore other data, find out more about certain aspects of the data, change the view of the chart, or any number of other things described herein. Next, 312 the application sends the request for related data back to the server over the network. Next, 314 the application receives a subset of the requested related data from the server and causes the chart 316 to be augmented, changed, or display the related data for the user. These last four steps 310, 312, 314, 316 may be repeated as needed while a user interacts with their chart via their mobile device and application.

Determination of Data to Send

The systems here can determine which data, and which amounts of data to retain in the networked side, and which to send to the local application side. The determination of how to do this and which data to send may involve at least three different methods each independently or in conjunction with one another. The three examples include 1—Data Aggregation, 2—Filtering and 3—SubView. All three methods can be used in conjunction or separately to achieve the desired user experience and allow data to be stored where it is desired to affect chart performance. It should be noted that each different kind of chart may have its own configuration and each chart may affect data selection differently, using the three methods described here.

1—Data Aggregation

The first example of how to help make large amounts of data include the systems and methods here used to aggregate data for display in chart form. There are multiple ways how such aggregation may be carried out. The back end systems as described here may utilize many different aggregation algorithms in order to turn the large amounts of data into manageable sets of data for display as charts.

For example, aggregation may be used to extract distinct values for a selected field and create an aggregate item for each distinct value. Such an example may be used for computing other fields using a selected aggregation function (for example min, max, average) and providing ways to drill down into the aggregated items to see individual items contained therein. Multiple aggregation levels can be used to achieve drilldown granularity and limit the number of items presented at each level. One example of multiple levels for calendar units may be: years/months/days/hours/minutes. Another example may be to use different category fields such as: car manufacturer/car model/production year. A new field containing number of cars for each model may be automatically added.

The aggregation may be done on the networked server and the already aggregated summary data may then be downloaded to the client application for display. However, such an example method may present challenges when a user wants to frequently switch between different aggregation modes, as the user may need to wait for the server to prepare new data sets that corresponds to the new aggregation criteria.

Certain embodiments here allow for more interactive ways to address aggregation. For example, certain examples allow performance of the frequently changed aggregation operations inside the client application. But if the un-aggregated data is too large to be practically downloaded to the client application, systems and methods here can use a hybrid model where aggregation over some fields is carried out on a back end server and more frequently changed fields are sent to the mobile application for aggregation on the client side.

The choice of the fields can be either developer specified or automatically detected based on user actions.

2—Filtering

Alternatively or additionally, the second example of how to help make large amounts of data understandable in chart form include the systems and methods here used to filter data for display. Systems and methods here may offer data filtering on both the client side and/or the server side. In some examples, applying such a filter may be implemented by preparing a new query for the database server which may result in longer than desired response times. To achieve a better response, systems and methods here may use a library to take advantage of local filtering without involving the networked server. This local filtering may be implemented using the local data cache as substitute for the database server.

Such client-side filtering my occur by applying certain filtering rules against the data that has already been loaded into a local data cache for a client. This may result in a new chart view where only items that are matching the filtering rules are visualized. Though various ways such as API and Chart Controls, it may be possible to modify the filtering criterion to achieve a visualization that is desired by the end user and/or other components that the system is integrated with.

In certain examples, interactive data filtering may allow a user to specify certain data filter criteria and view data that matches the filter. For example, in a network chart a user can choose to see only nodes that match a certain criteria. Those nodes that do not match the criteria can be either hidden or inactivated.

3—Sub View Filtering

Alternatively or additionally, the third example of how to help make large amounts of data understandable in chart form include the systems and methods here used to sub filter data for display. Subview may include a specific type of filtering where the system selects a subset of the overall data available for use in a particular chart. Selecting the subset of the data to be shown may depend on which chart type the user specifies. For example, in a Time Chart the selected time range on the X Axis may determine the subset of data that is visualized. For example, in a Pie Chart, the navigation state of "previous" and "others" may determine which part of the data set is being visualized in the chart. For a network chart, a subset of visible data may depend on the active nodes in the chart, which may be determined by the initial setup, user interactions and other interactions with chart through API. In an example Facet Chart, a predefined number of items may form the data set to be displayed but using different navigation methods it is possible to change the visible subset of data. Time Charts may use automatic aggregation on a time axis and a developer-provided filter function for filtering. Pie chart provides aggregation by using a user-specified list of data fields to use for aggregation and a developer-provided filter function for filtering. Network chart accepts a developer-provided filter function for filtering.

Example Charts

Depending on what users wish to do with their data, and what form their data takes, the users can utilize many kinds of charts to analyze, manipulate and display their data for consumption. This includes using different chart components to address different data sets and use-cases such as Time Charts, Pie Charts, Net Charts, Facet Charts, Event Charts and Geo Charts.

In order to make charts and graphs interactive, the user may be able to select certain aspects of the charts and graphs to view different aspects of the data visualization. In order to package more information into digestible visual renderings, certain visual hints may be used to indicate multiple layers of data or options of visualizations to the user.

Charts with Hints

Thus, alternatively or additionally, the systems and methods here may use Visual Hint technology to communicate different interaction options throughout any of the various charts. Such visual hints can be communicated in many ways and allow the user to learn how to manipulate and view a given chart. These visual hints may be selected by a user via any kind of interaction such as a tap, click, or other selection methods described here.

Time Chart Examples

Figure 4A:
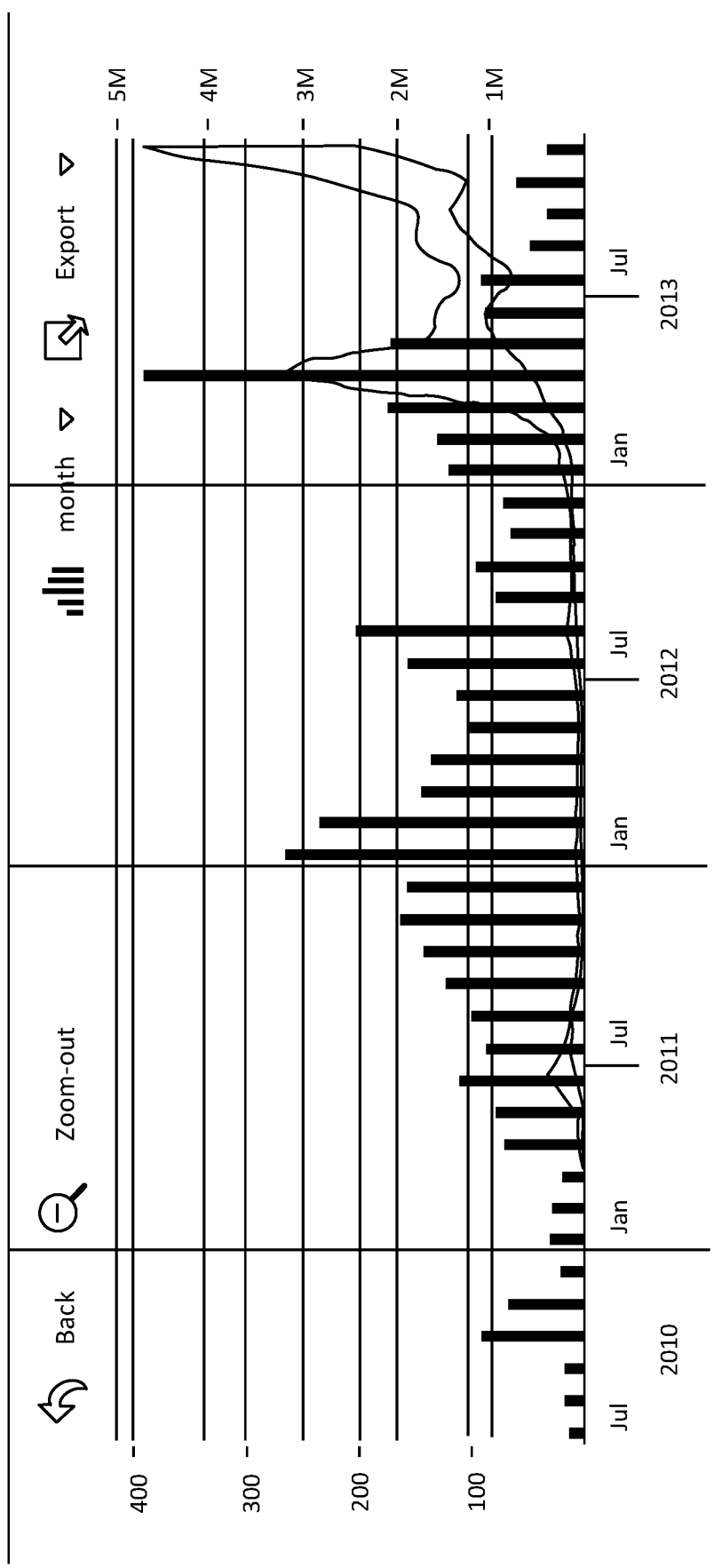
FIGS. 4A-4E are example charts of components according to examples described herein.

FIG. 4A shows an example Time Chart 400 which is a chart that enables visualization of time-based data. A Time Chart may be a component for visualization data that has associated time stamps. A Time Chart 400 primarily works with data that has time/data identifier. Such a Time Chart may be used by a user for many purposes including, but not limited to,
1) Being able to see the big picture and dive into details with the navigation methods that systems and methods here may provide. These charts show more detailed data as users navigate the charts. The data may be pulled from the server side and loaded locally in specific groups because uploading all data from server to client device may not always be feasible.
2) Alternatively or additionally, when time periods are selected by a user, a Time Chart component may work as a time selection component for other chart instances. Such a selection may cause the system to request data from the networked storage and use it to display more or different information to the user at the chart. Using Time Charts may allow a user to select a desired year/month/day or any other period. When a new time range is selected, the system may inform linked charts and/or other components that the time period has changed so that linked entities could update and show data only for the selected period.
3) Alternatively or additionally, when a user finds a time period in which data is relevant, the user can export the data as image (jpeg, png, pdf, or csv) file for further processing.

Time Chart Hint Examples

Figure 4B:
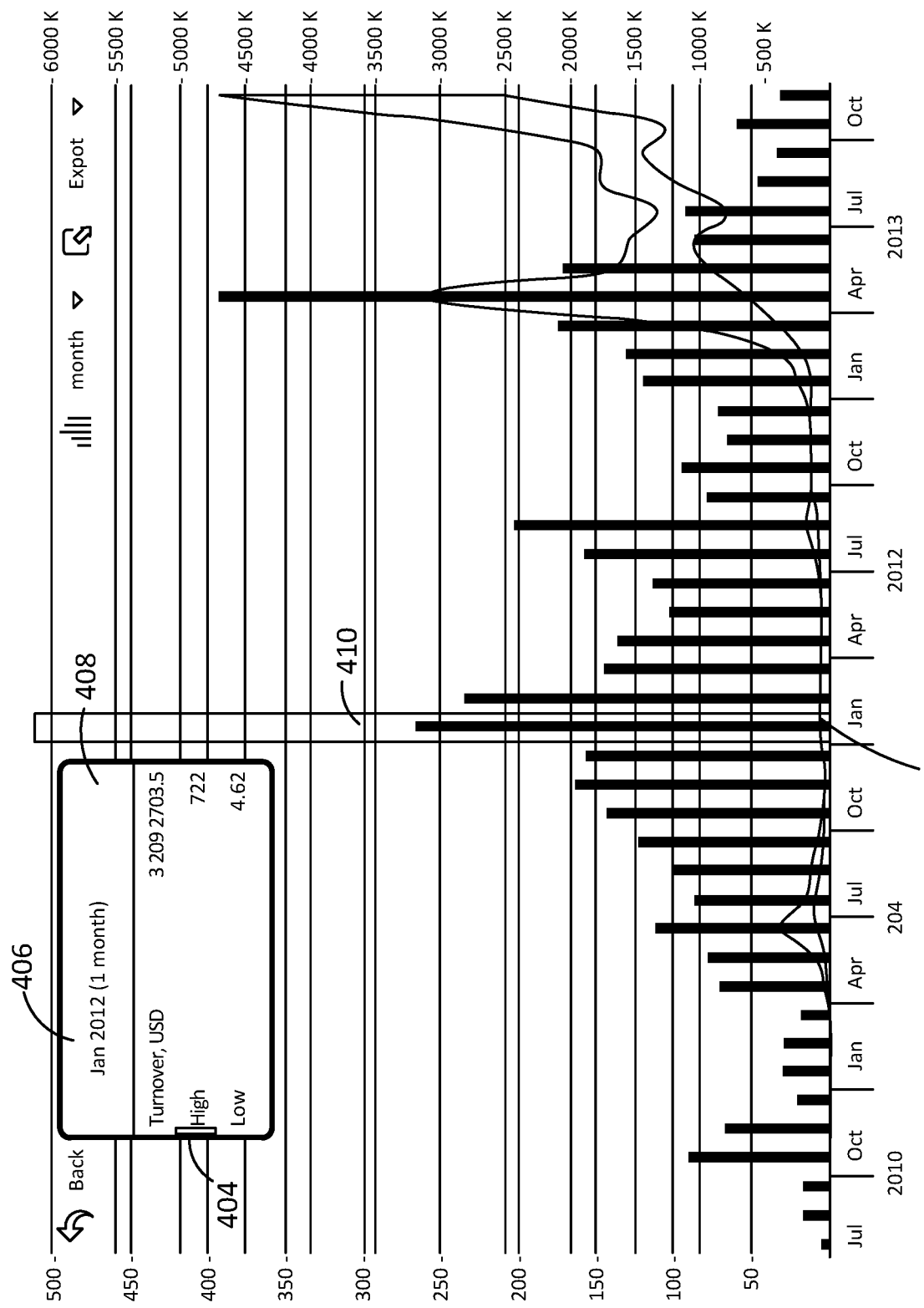

FIG. 4B shows an example of a hint to a user, which is the series that has the data in the info popup, and a side bar for the series name in the color that the series is. In that example mouse is over the shaded area 402 in the January 2012 column, and in the info popup 408 we are seeing the correspondingly shaded bar on the left 404 of the name of the series 406.

Info popup 408 has a triangle to indicate to which data point info popup data refers. Selected period of time is highlighted 410 in contrast color to hint user which data point is currently selected.

Toolbar items that have a popup menu 408 have arrow pointing downwards to hint user that there is a list of options to select from.

Figure 4C:
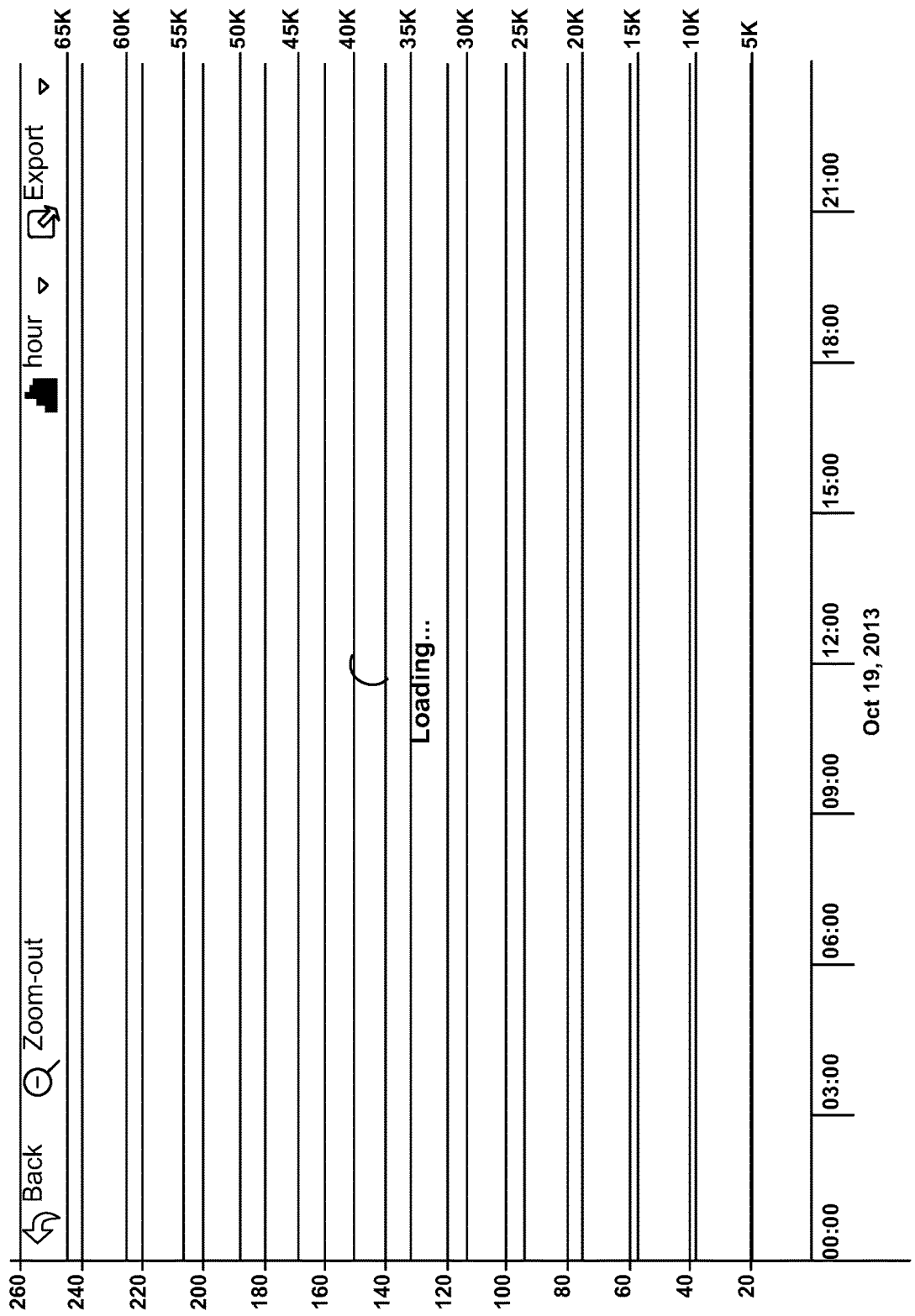

FIG. 4C shows an example chart hint to hint to a user to indicate that currently data is not available to display the series in the selected time period for the selected aggregation unit.

Figure 4D:
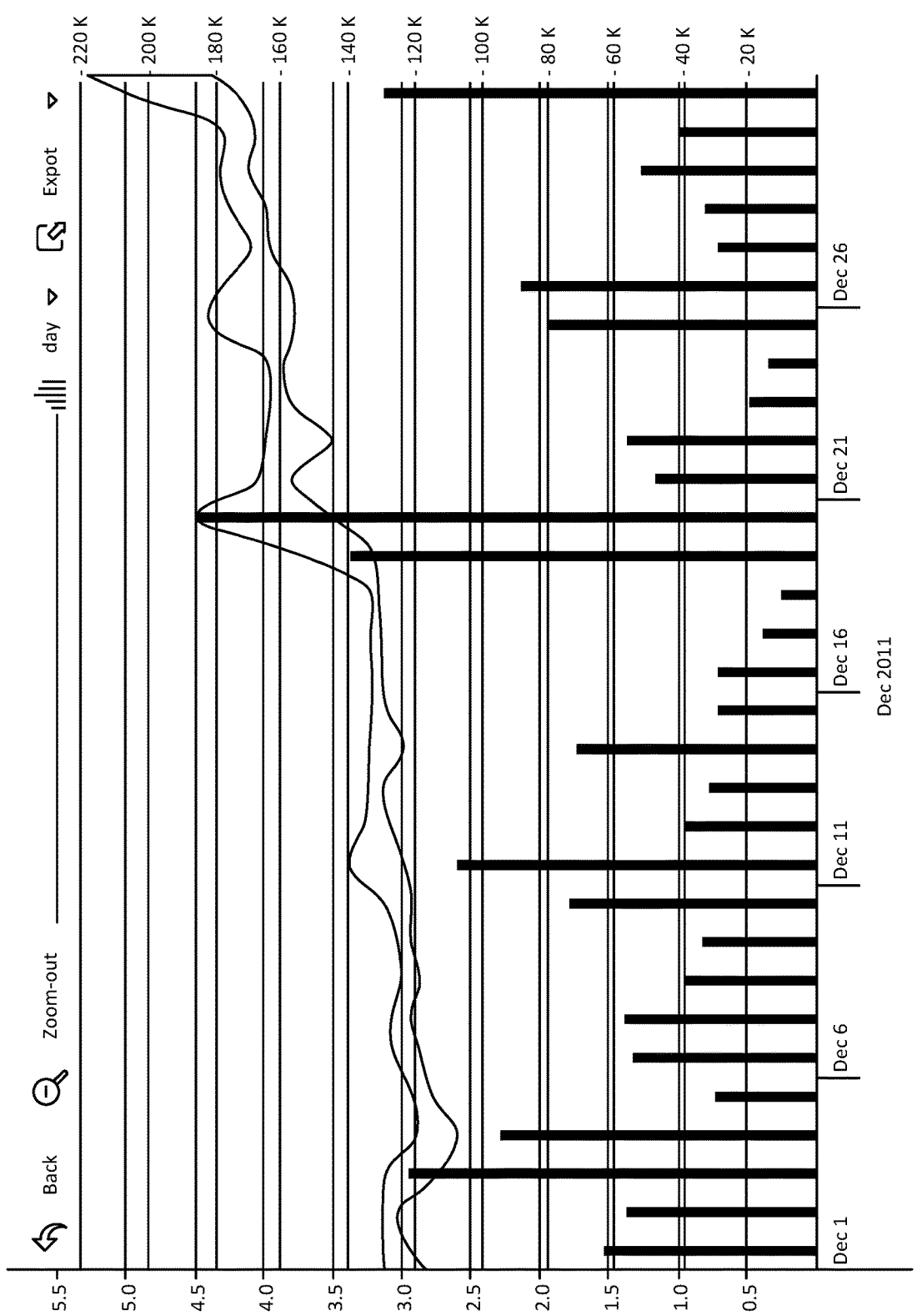

FIG. 4D shows an example where to hint to the user which days are weekdays, the systems and methods here may let a developer select a different background color for those.

Figure 4E:
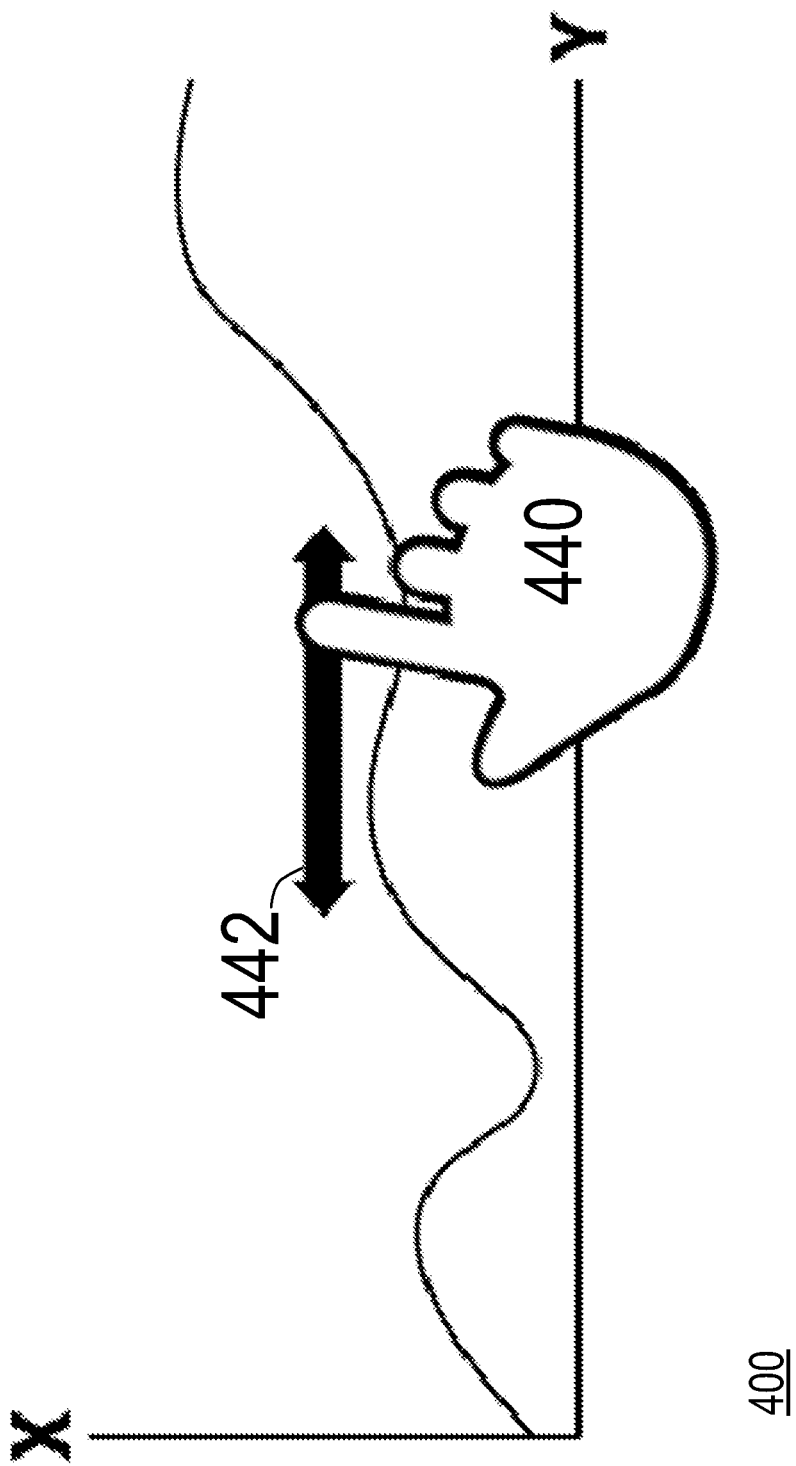

FIG. 4E shows an example graph where a user gesture or click changes the range of displayed values for the horizontal axis. The example shows a computer mouse or pointer 440 being used by a user to drag the axis either to the left or right 442 resulting in different data points being displayed on the graph 400. This user input could result in a request to the server for more or different data, according to the descriptions described herein.

Network Chart Examples

Figure 5A:
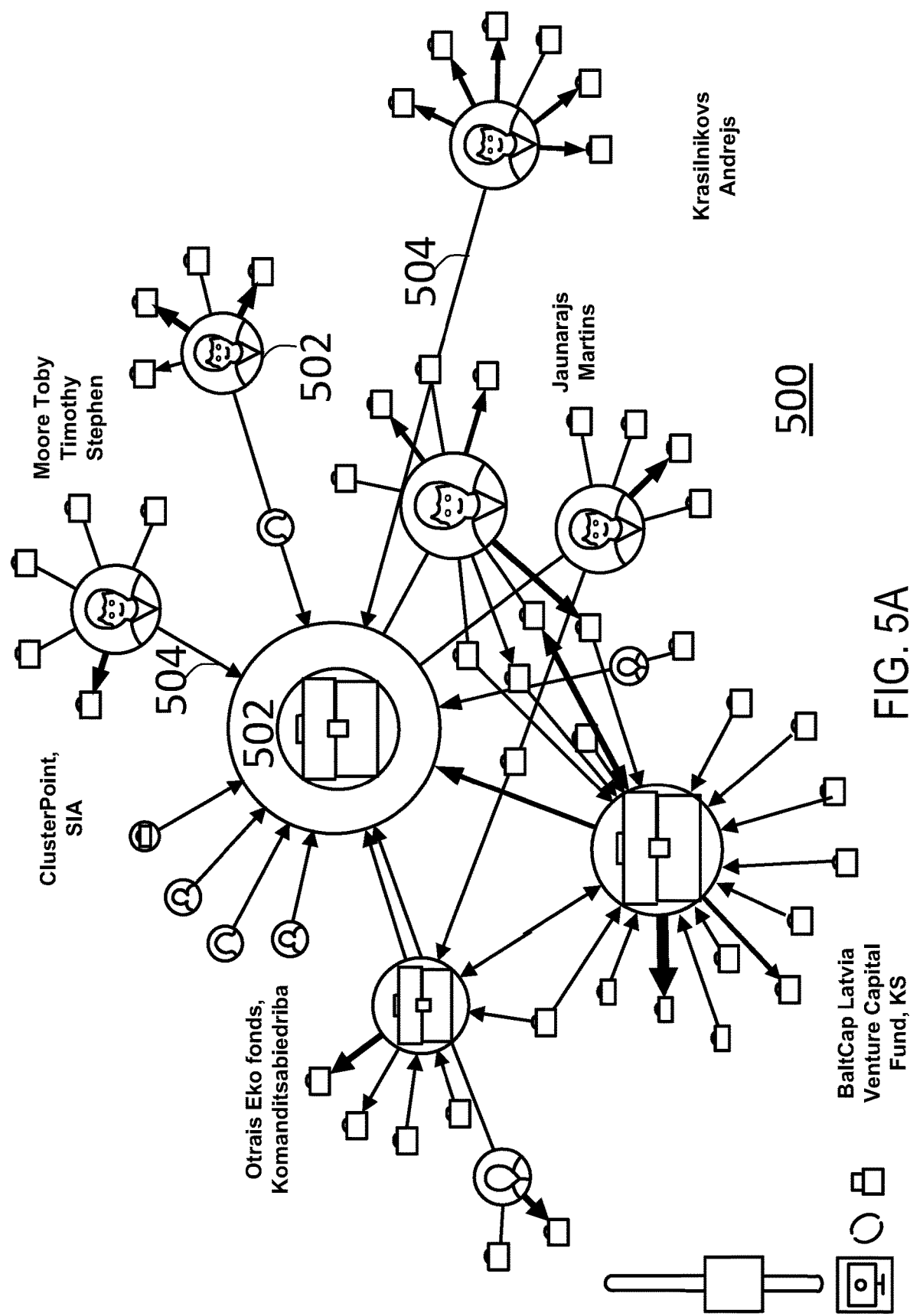
FIGS. 5A-5E are example net charts according to examples described herein.

FIG. 5A shows an example Net Chart 500 which is a component that enables visualization of graphs and relations between items 502. A Net Chart 500 may be a component for visualization of data that has relationship information in it. A Net Chart 500 is designed to specifically display graph data such as nodes 502 and links 504 between and among nodes 502. It may be used for visualization for example, but not limited to,
1) Ability to discover the relations among things via visual interaction with nodes, items, and displayed links. This visualization may enable users to explore any part of the network of data and find relevant information.
2) Alternatively or additionally, through integration a user may consume content when a relevant node is found in the chart. This can be implemented in number of ways, such as, binding certain activities on different input types and/or showing auxiliary information in a pop-up information window.
3) Alternatively or additionally, update to a state may occur in real time. Thus, it can be used to monitor events as they happen. For instance, Net Chart can be used to visualize the process list on any computational device that provides an API/system calls through which such process lists can be obtained. Nodes can be visualized depending on the resources they consume e.g. the more CPU/Ram process is using the larger the node. Similarly, child processes that consume most resources would have most wide links to them with visual hints about the resource consumption. Here, additional input can be linked to nodes to either get more information about the processes or to stop them.
4) Alternatively or additionally, through the radial layout users may visualize ordered lists in predefined sequences, thus visually to show structure for a selected data set, different from a baseline image. Such visualization may enable quick error checking through visual pattern recognition.

Figure 5B:
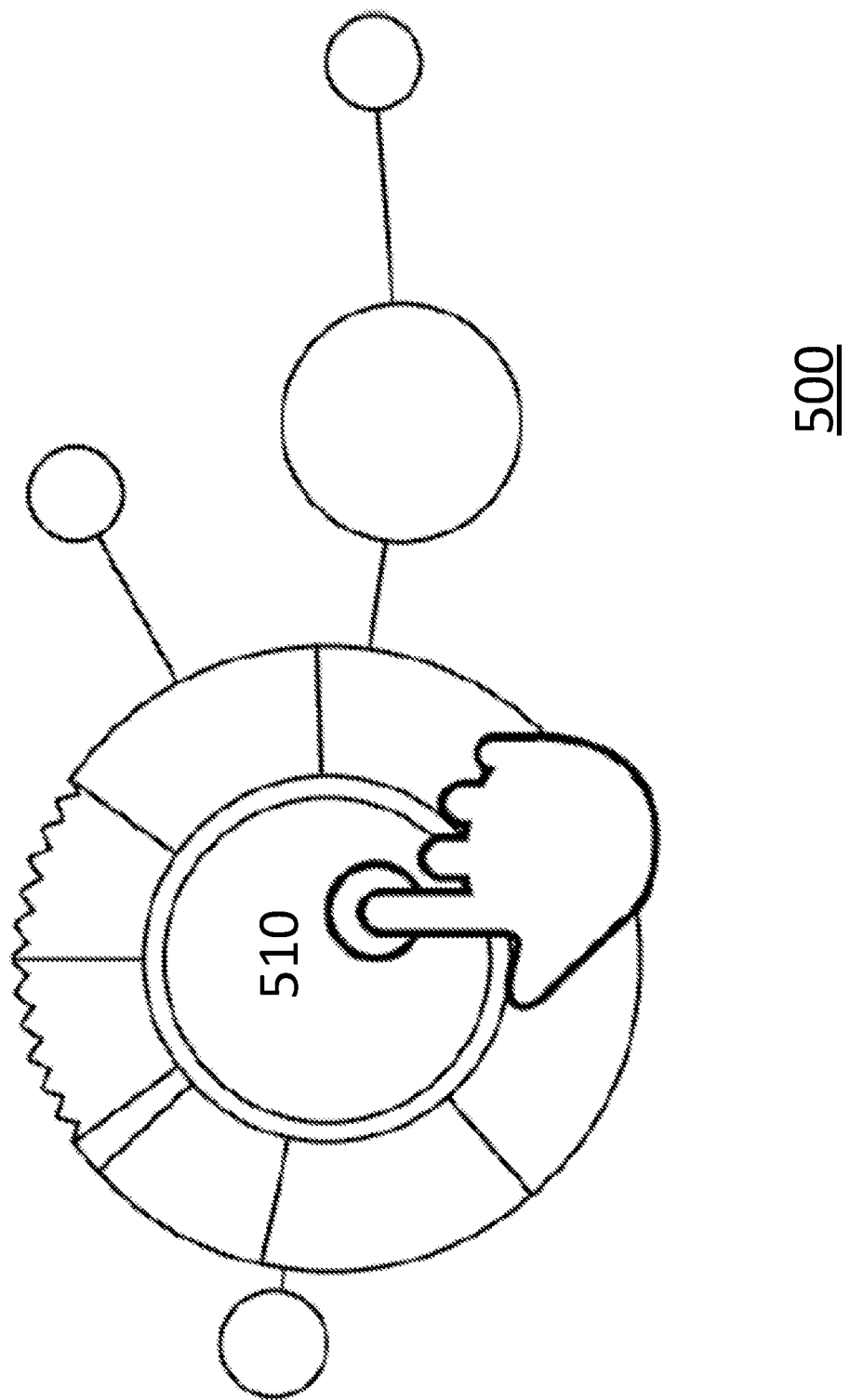

FIG. 5B shows an example hybrid Pie Chart and Net Chart 500 where a separate graph 510 is added to one or more graphical elements that display data related to the graph 510.

Figure 5C:
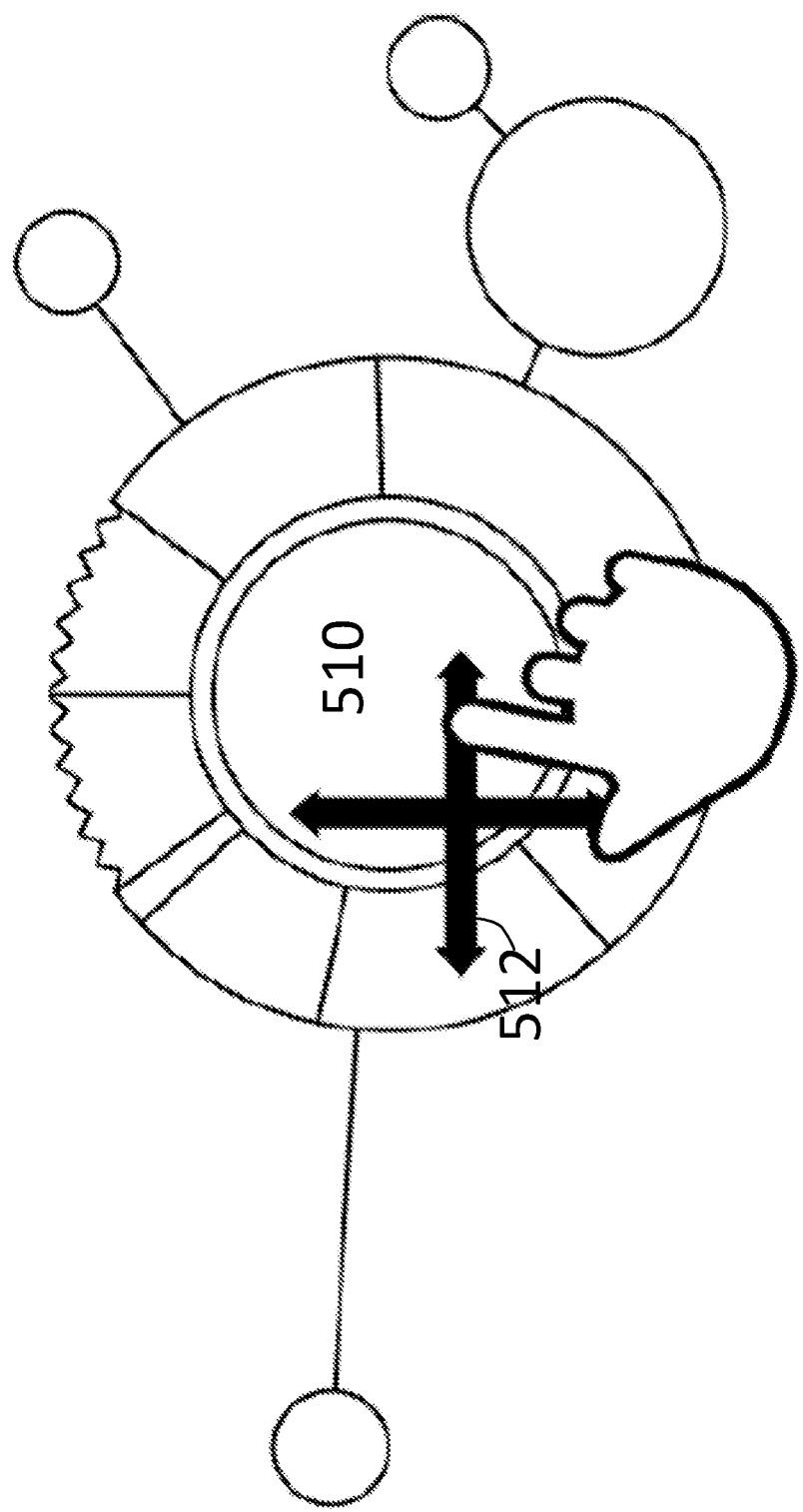

FIG. 5C shows an example hybrid Pie Chart and Net Chart 500 where the relative position of the separate graph 510 and the graphical element is constant when the absolute position of the graphical position is changed 512 in this case by a click or touch by a user on the interface.

Network Chart Hints

Figure 5D:
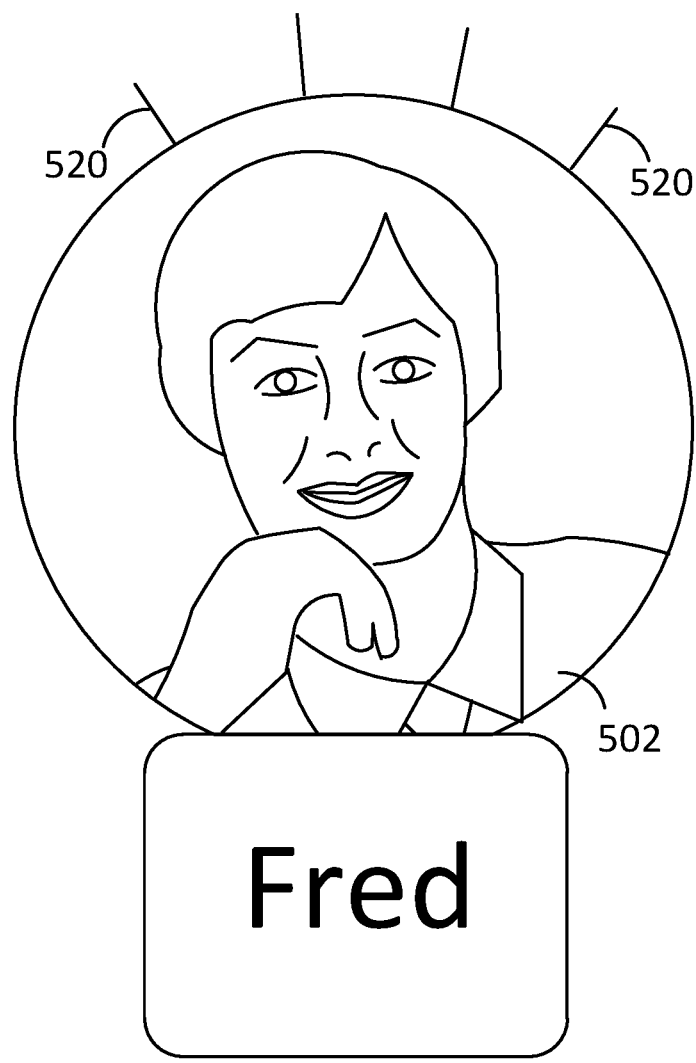

FIG. 5D shows example embodiments where a hint to a user that nodes are expandable are displayed with different visual clues such as small lines 520 attached to the node 502. In some embodiments, the small lines 520 could move or blink in order to inform the user that they are expandable as well. Other ways could be used besides the small lines but this is only an example.

Figure 5E:
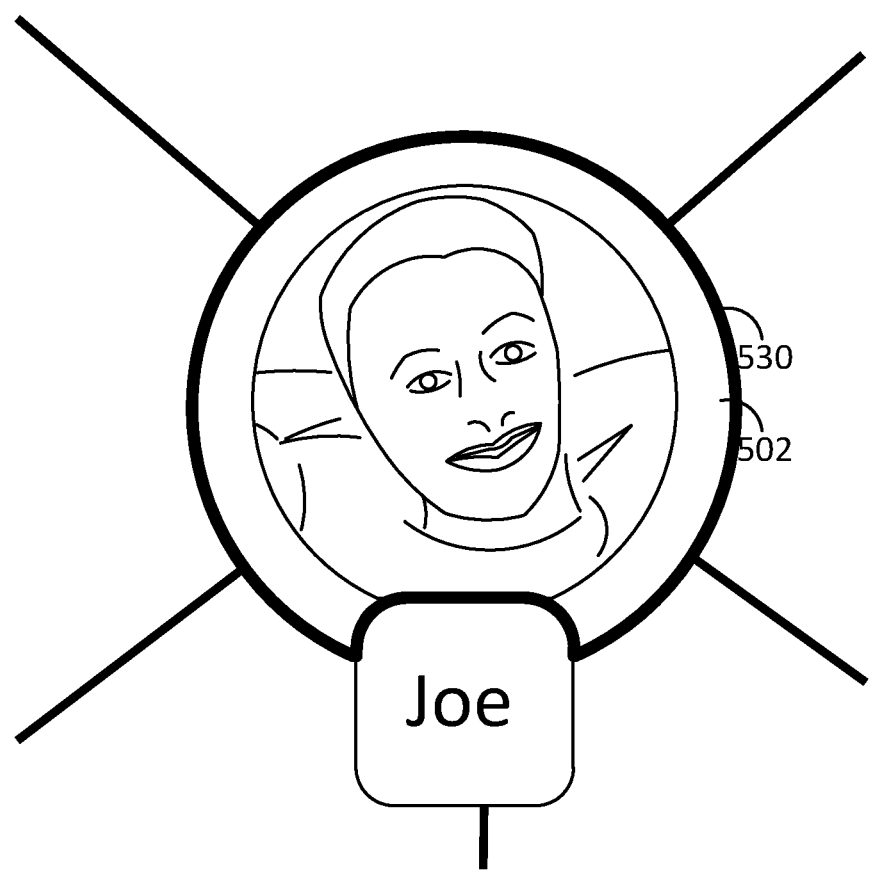

FIG. 5E shows an example where the system displays a hint to a user that the node 502 is focused on this particular node, a thick outline 530 may be displayed around the graphical indicator of a node 502. This may indicate or hint to a user that the node can be configured to match the style of the end user application.

Pie Chart Examples

Figure 6A:
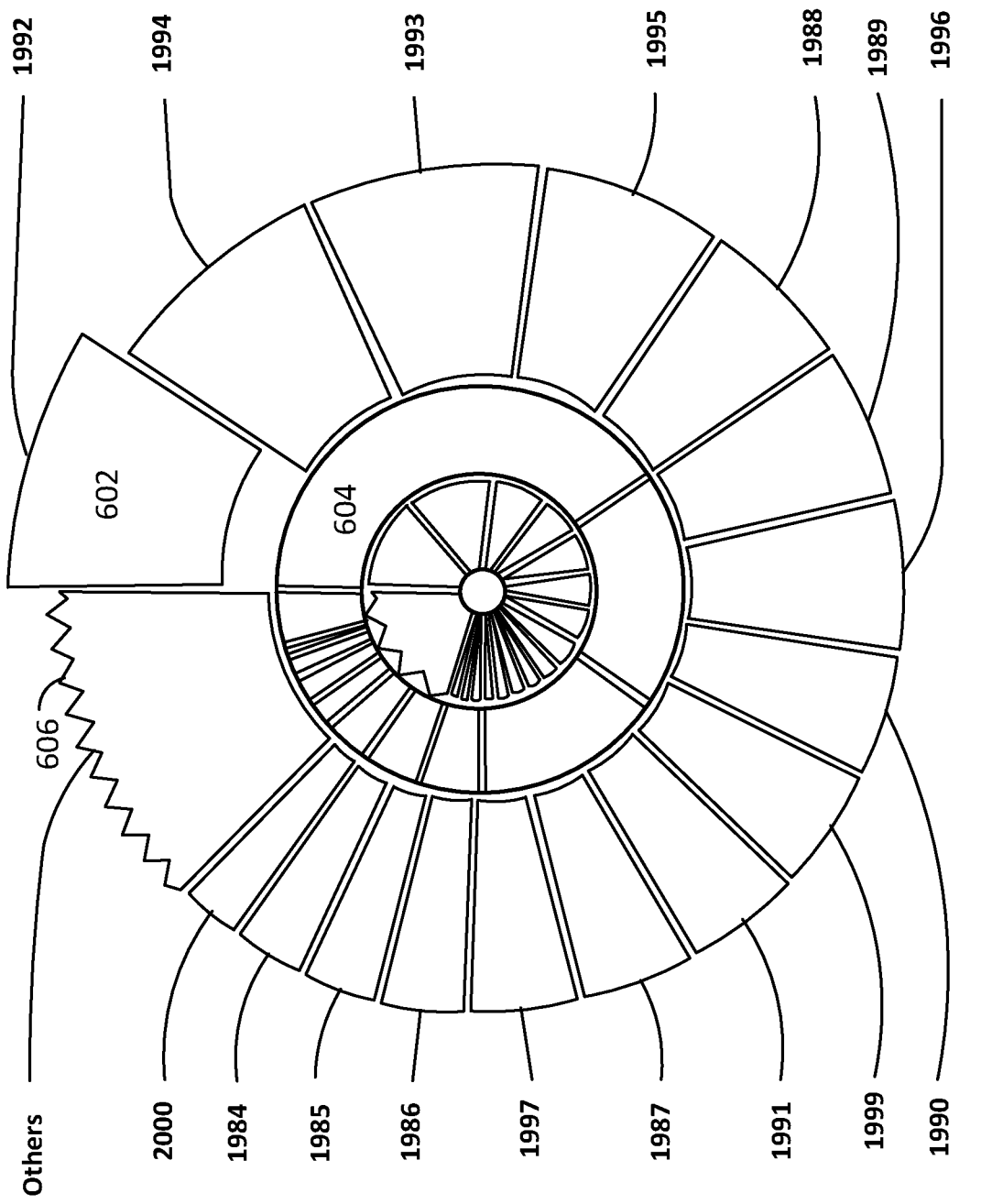
FIGS. 6A-6H are example pie charts according to examples described herein.

FIG. 6A shows an example Pie Chart 600 that enables visualization of data to be compared by any means such as value. A Pie Chart 600 may be a component for visualization of data that can be categorized by any category parameter and compared by any means.

It may be used for visualization for example, but not limited to,
1) Displaying layered data which may be made accessible to a user through interaction. For example, interacting with a slice of a pie chart may cause display of deeper information such as the breakout of more granular data, more details on the data, etc. Interactions may include but are not limited to clicking, tapping, hovering, gestures, etc. with pie slices to cause display of more data. Such interaction may cause the system to request more or different data from the networked storage for display on the local chart. In some examples, interactions with the Pie Chart may cause visible slices to be hidden and replaced with a slice called "Previous" 602. To get back to the previous slices, interaction with "Previous" may cause display of earlier displayed data.
2) Alternatively or additionally, hierarchical drill-down lets a user interact with any Pie Chart slice to reveal the next level of data 604. Data in the next level 604 might be associated with the upper level 602 e.g. if on top level top categories may be aggregated. Interaction with any category could reveal the internal composition for that category. In some examples, when clicking on a slice 602, in the next level 604 new slices could add certain activities such as on top level may include names of files, then when a slice interacted with, in the next level actions may be performed with that file such as to edit, save, download, delete, etc. that file. A user may then can add certain functionality to each of those slices.

PieChart Hints

FIG. 6A shows an example where to hint the user that a slice of the pie chart is expandable, that slice is shown using a saw tooth-like outer line 606. This shows up on the "others" slice in the example.

Figure 6B:
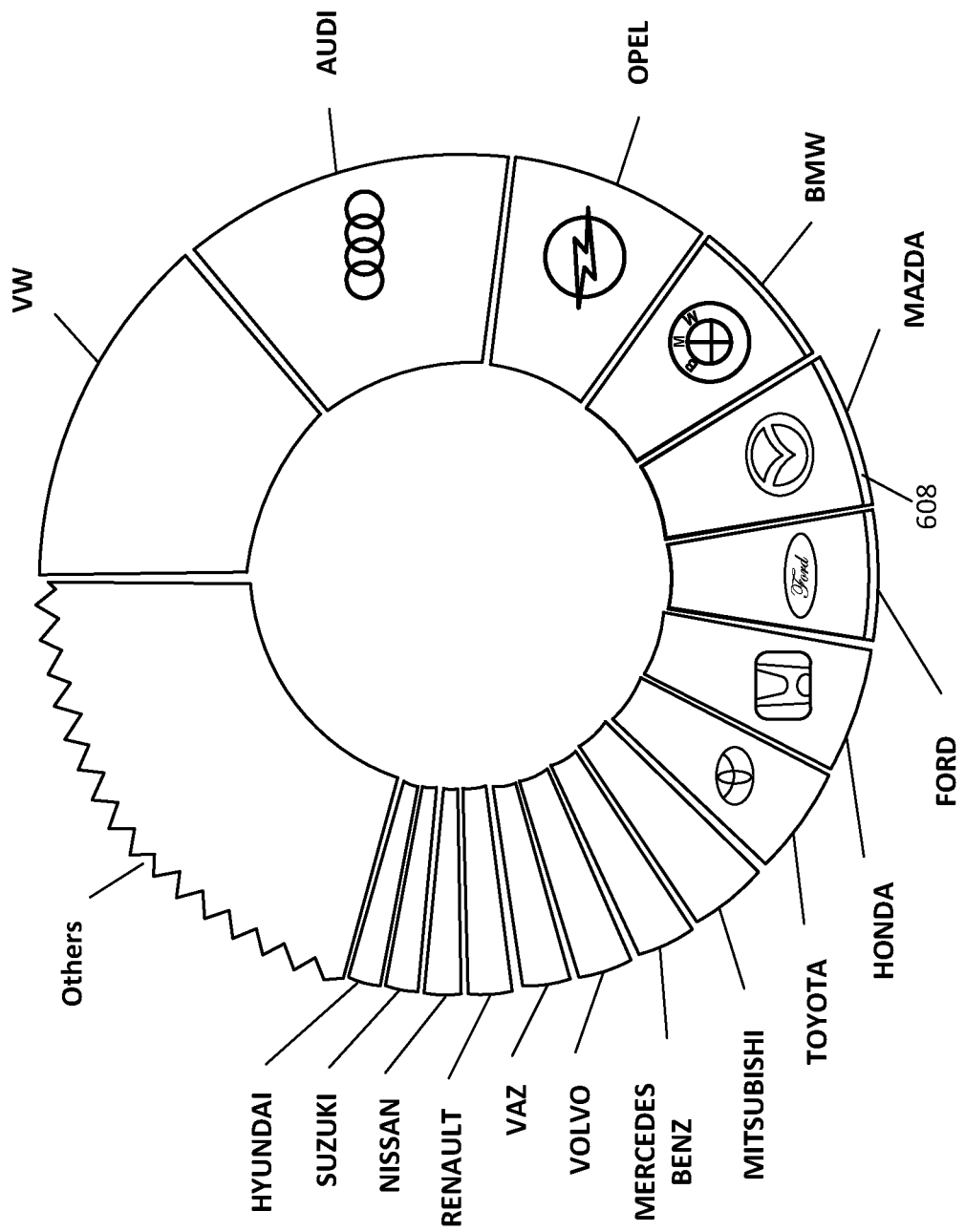

FIG. 6B shows an example where to hint the user that slices contain deeper levels of data, the systems and methods here may use multiple lines for slices. For example, in the slices that may be selected for deeper levels of data, two lines shown as concentric circle portions 608 are displayed.

Figure 6C:
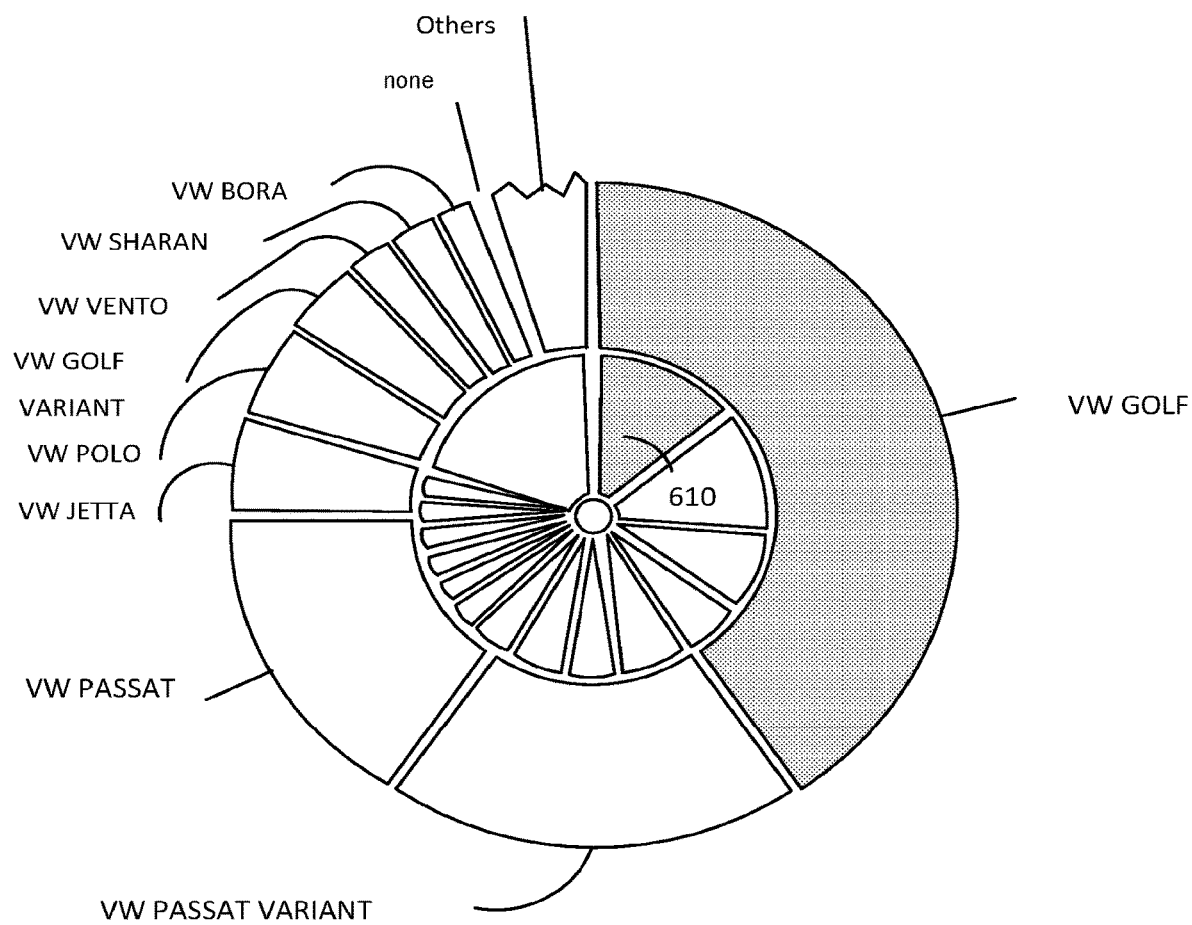

FIG. 6C shows an example where to hint the user that there is upper level pie available, a summarized chart may be displayed in the middle of the pie chart 610. To hint user which slice was selected in the upper level pie, a highlight for that slice in the middle pie may be displayed, which may appear when users enter a deeper level.

Figure 6D:
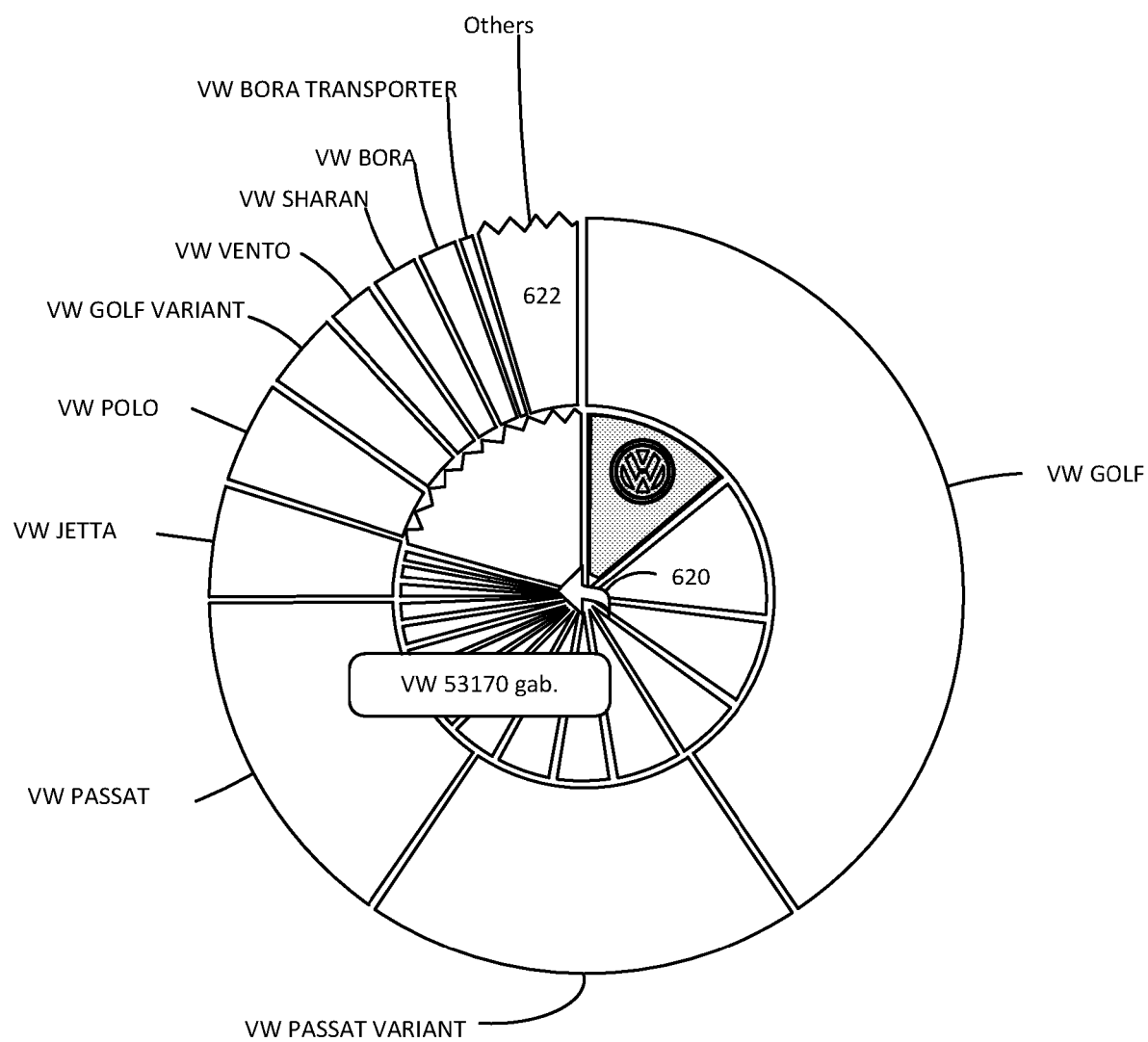

FIG. 6D shows an example where a slice "previous" is used to hint that the user has moved further in the data set using either "others" slice 622 or if state of current pie was altered via API. In some embodiments, it is possible to define data offset for the view via API navigating user to the point in a data set that is required. In this case there would be both "others" 622 and "previous" slices if there is more data outside the visible Subview.

FIG. 6D also shows an example where to hint to the user that clicking an arrow 620 in the middle of the PieChart will take him to upper level.

Figure 6E:
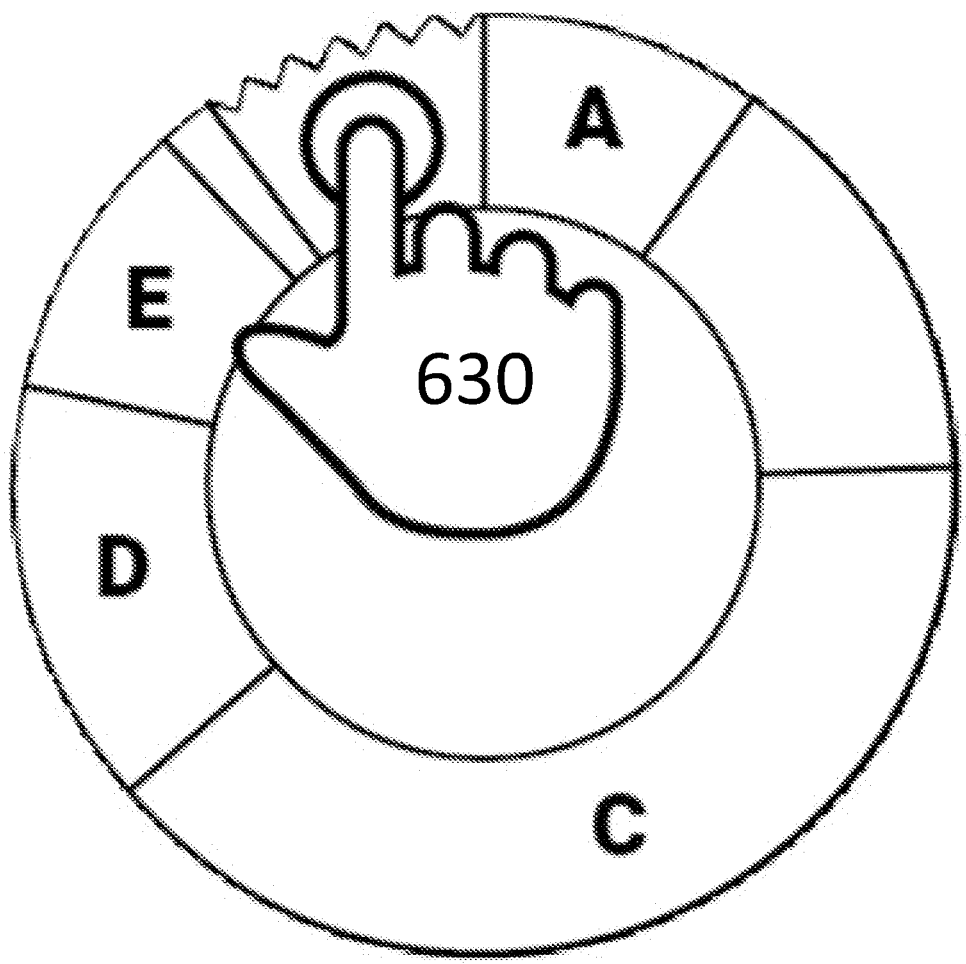

FIG. 6E Shows an example where a pie chart 600 with aggregated slices can be interacted with using input device such as computer mouse or touch screen interaction 630. The system may respond to such interaction with displaying a replacement of the selected slices with the slices that are aggregated within that slice.

Figure 6F:
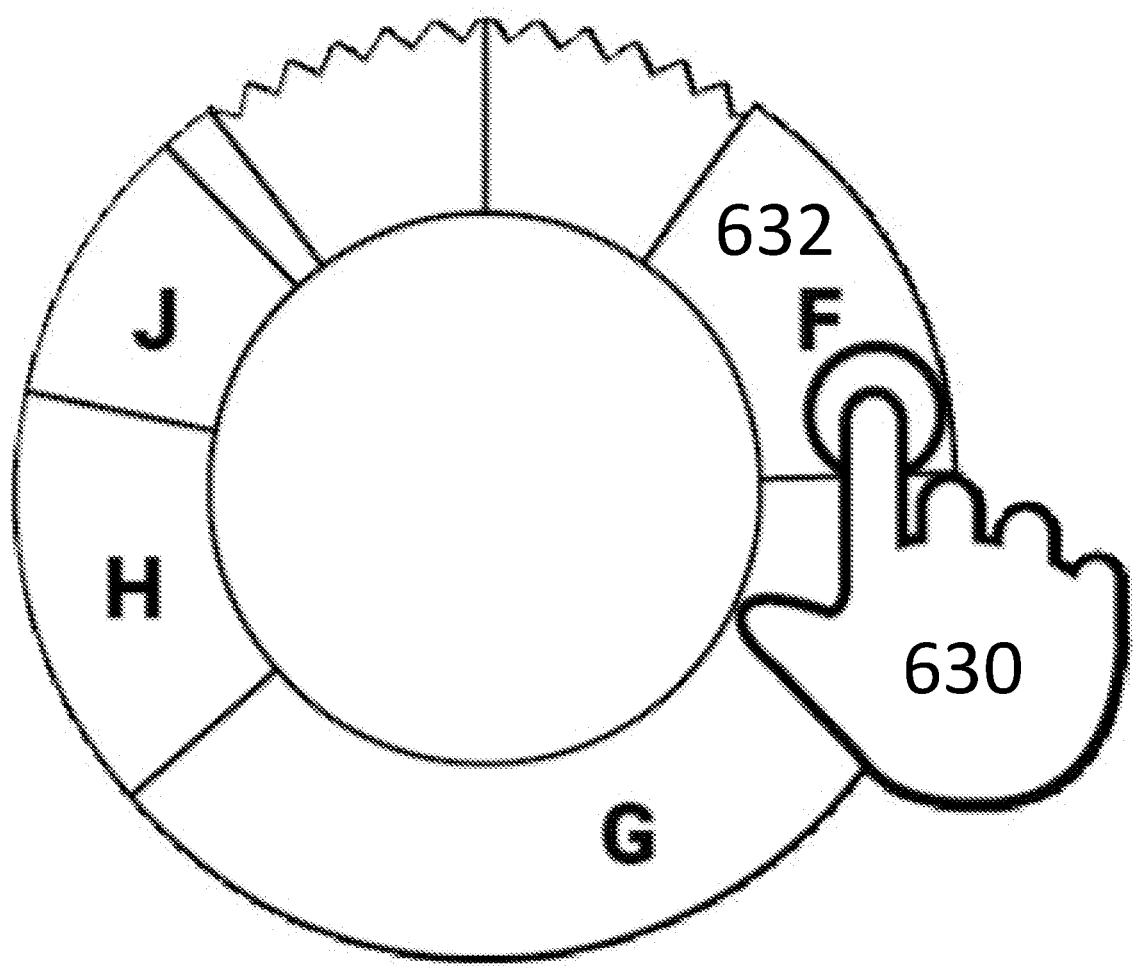

FIG. 6F shows an example where a pie chart 600 with replacement of the displayed slices 632.

Figure 6G:
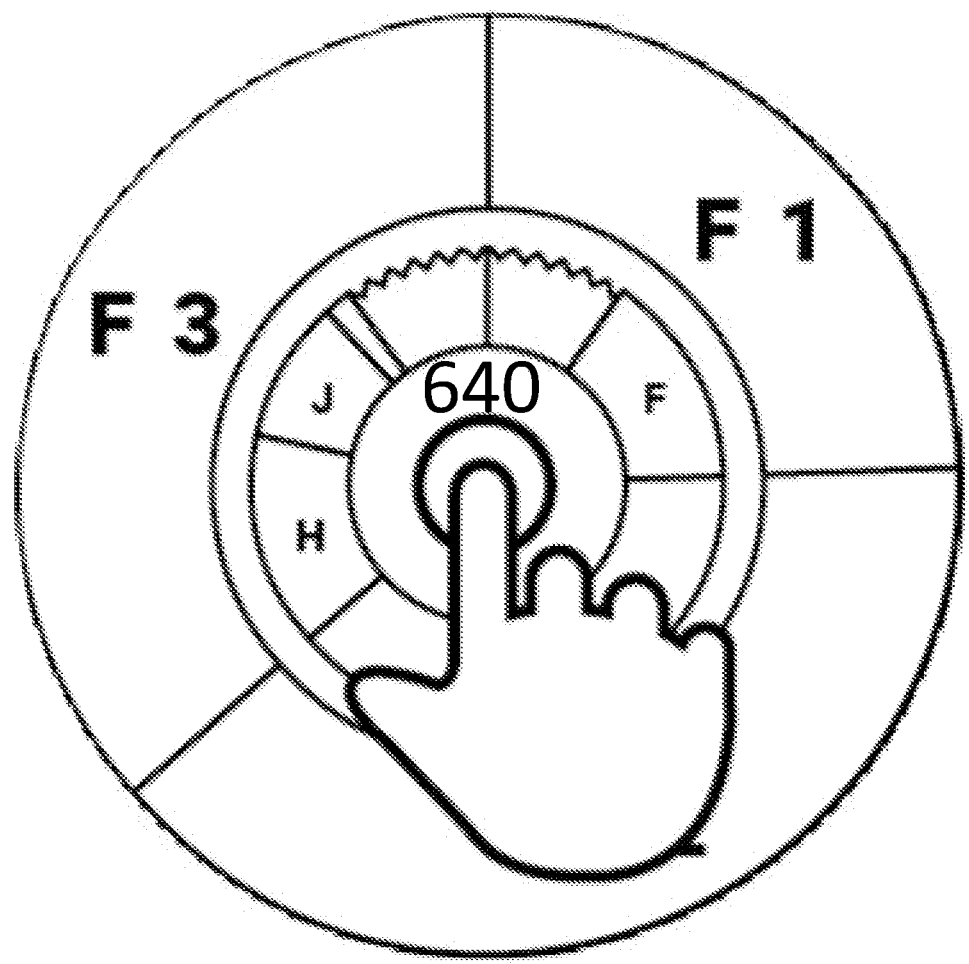

FIG. 6G shows an example where a pie chart 600 has the previous slices reduced in size and displayed above the new slices in the center of the graph 640. In some examples, the center area of the graph can be interacted with resulting in replacement of the displayed slices.

Figure 6H:
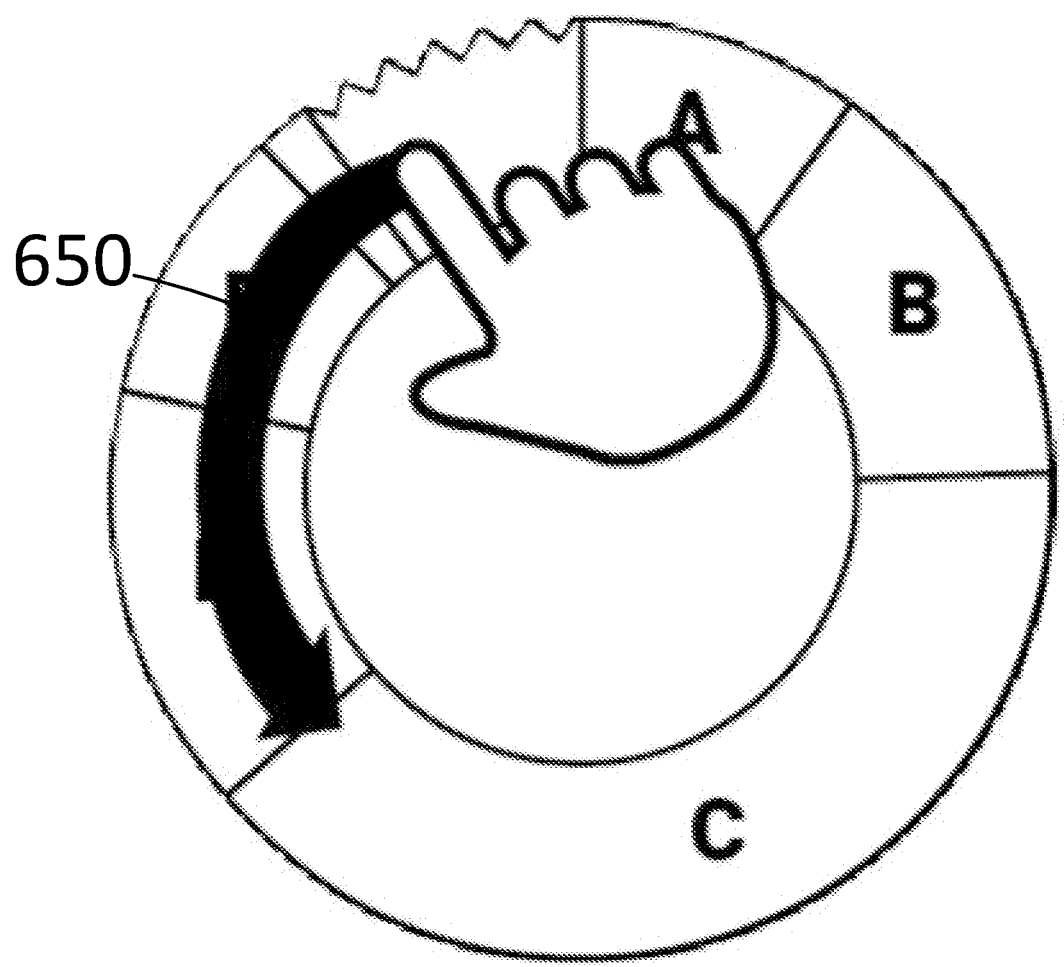

FIG. 6H shows an example where a pie chart 600 where the graph can be rotated 650 using an input device such as using touch gestures resulting in removal or addition of a slice.

Facet Chart Examples

Figure 7:
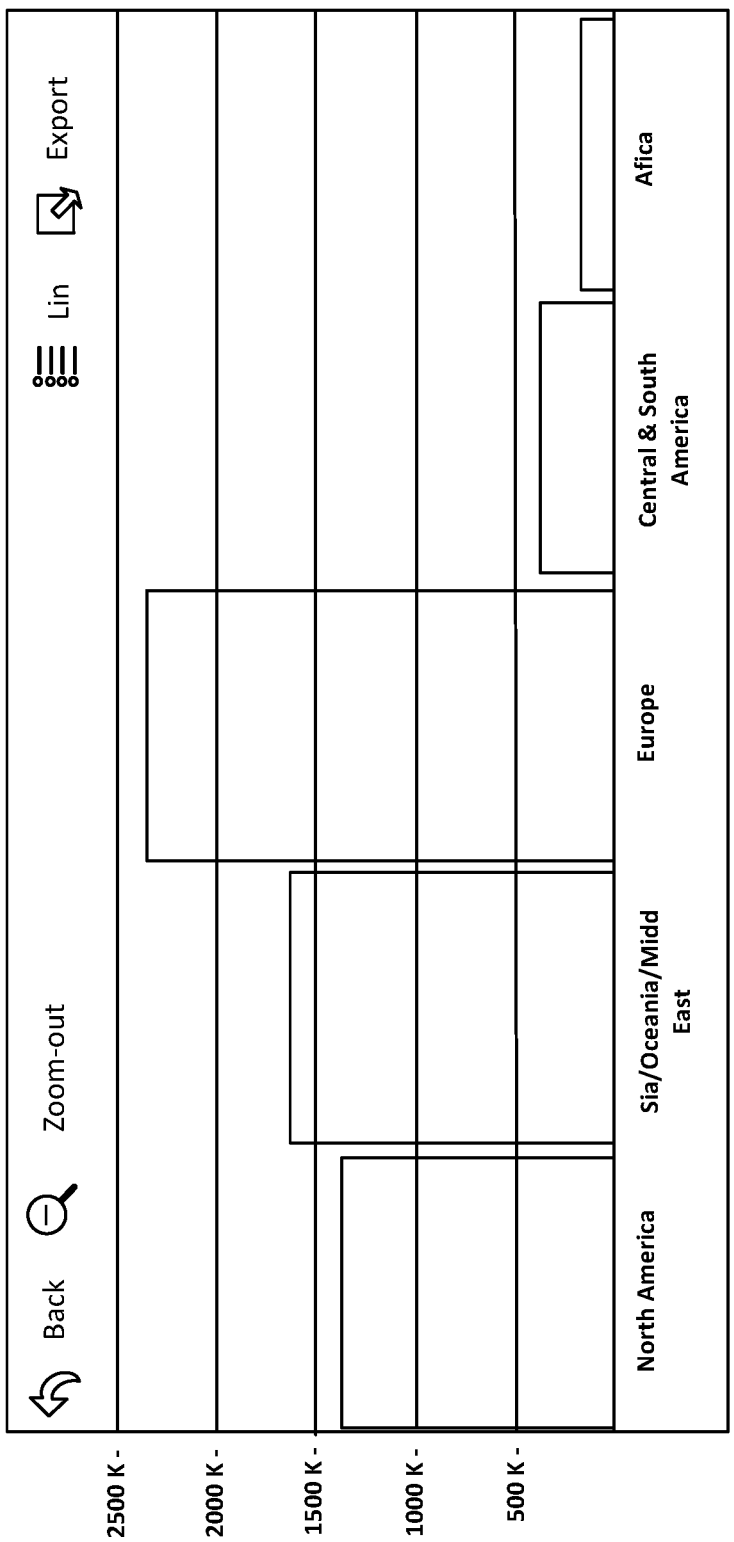
FIG. 7 is an example facet chart according to examples described herein.

FIG. 7 shows an example Facet Chart 700. A Facet Chart may be a component that enables visualization of data that can be compared by any means such as a value. A Facet Chart 700 may be a component for visualization of data that can be categorized by any category parameter and compared by any means.

It may be used for visualization for example, but not limited to,
1) As with Pie Chart, Facet Chart 700 lets a user explore all data points that there are in the data source. To keep the chart usable, a Facet Chart may show a predefined number of data points in one Sub View and using interaction methods such as scrolling it is possible to explore data points that are not visible in the initial Sub View. In such a way, the end-user may have the ability to explore all data.
2) Alternatively or additionally, facet Charts may enables drill-down for the data. When a user interacts with data points on any level, the system is able to retrieve sub-data for that point and cause it to be visualized within the same chart. In such a way, users can navigate vast amounts of data with intuitive navigation functions.
3) Alternatively or additionally, facet Charts may allow comparison of side-by-side data from the same category but different aspects. An example may be a comparison of sales by categories and comparison of sales in particular categories by years in one graph. In such a way, Facet Charts may enable users to explore historical data and see the changes in trends.

Figure 8A:
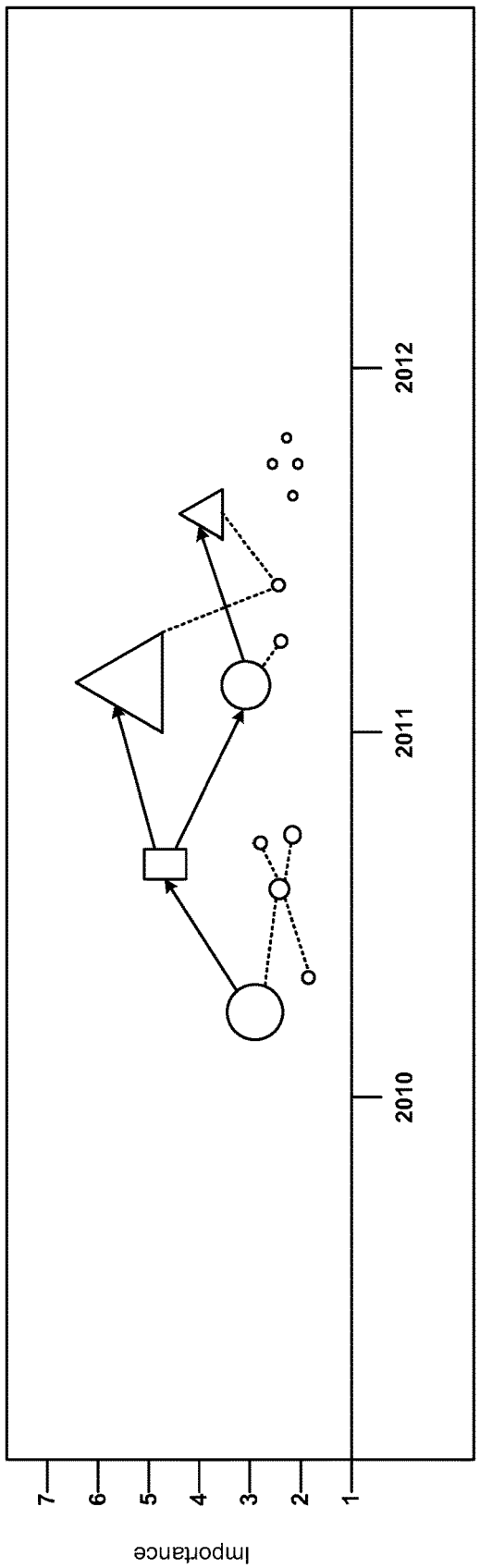
FIGS. 8A-8B are example event charts according to examples described herein.
Figure 8A:
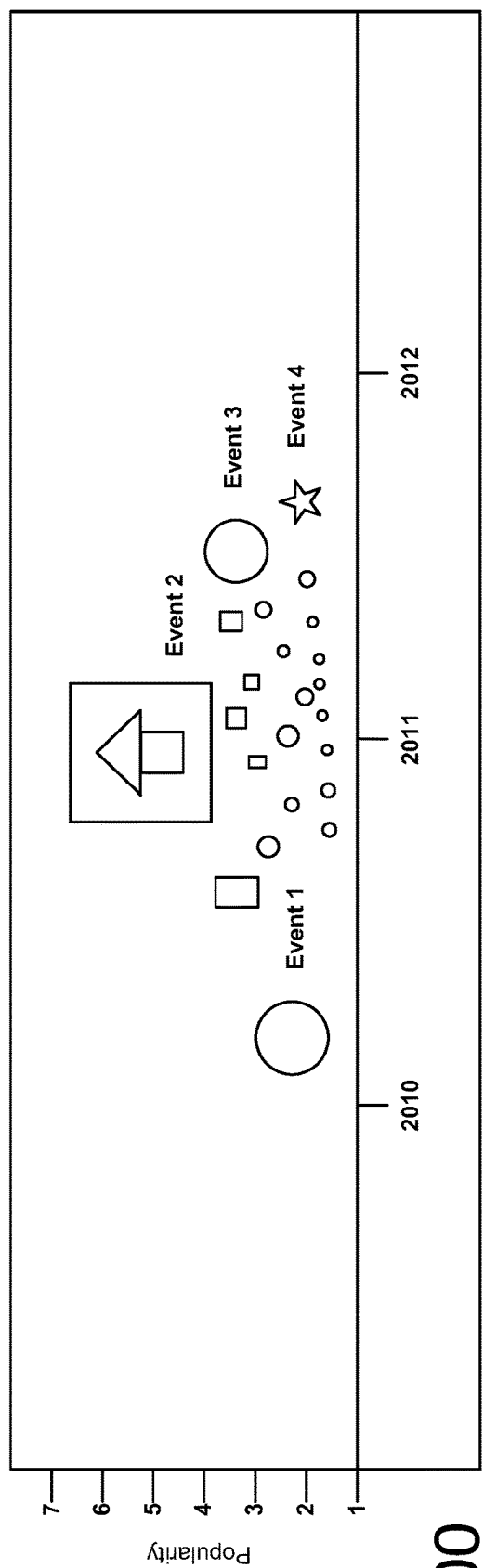
Figure 8B:
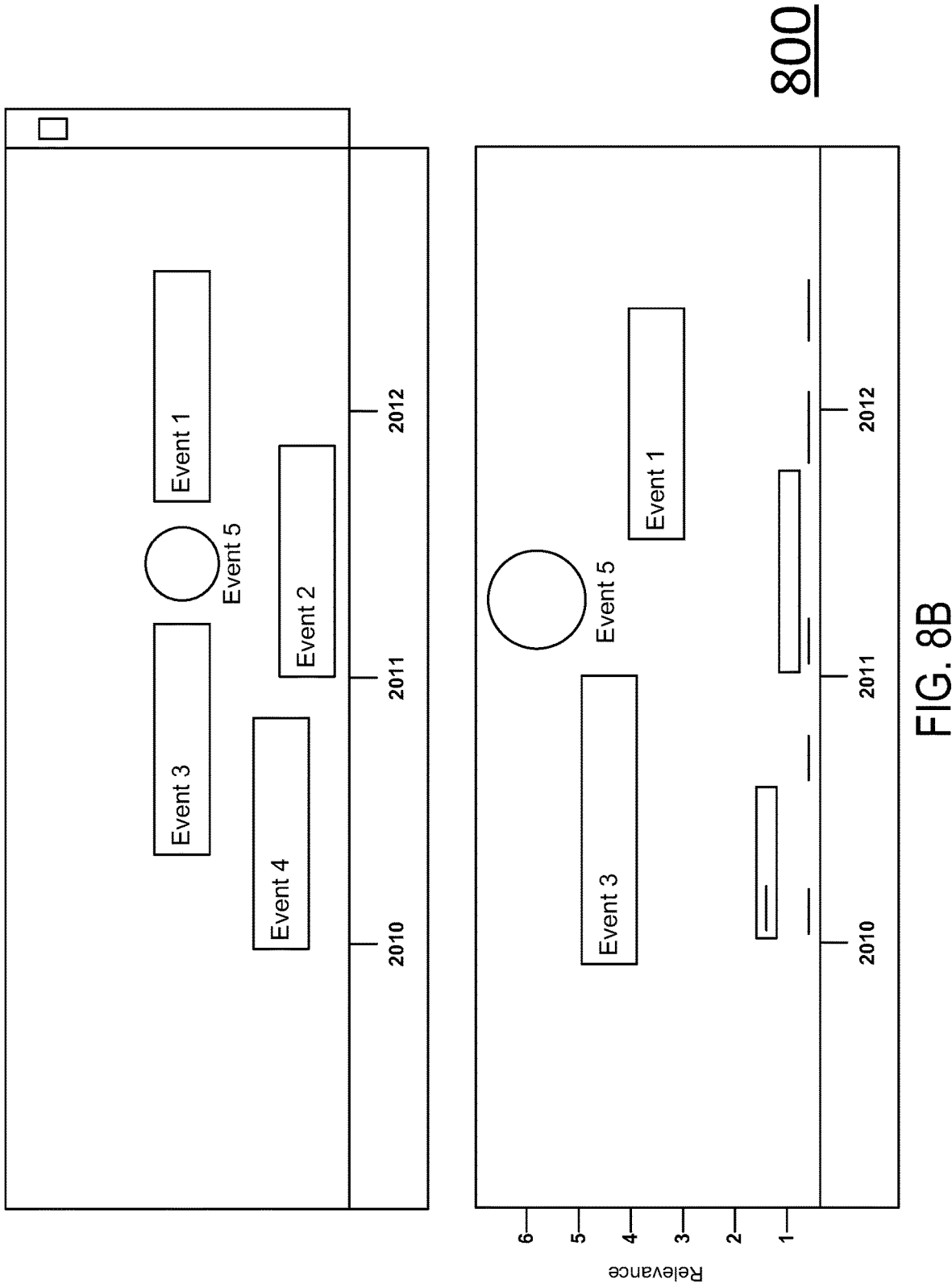

FIG. 8A and FIG. 8B show example Event Charts 800. These Event Charts 800 allow visualization of data that has some duration in time. An Event Chart may be a component for visualization of events that have associated time information with them. Event Charts are designed to display data that has time attributes and is not being aggregated.

It may be used for visualization for example, but not limited to,

1) Allow users to see a big picture and easily zoom into any time period that is of particular importance to them.
2) Alternatively or additionally, see how events are linked, what are previous events, what are next events.
3) Alternatively or additionally, planning and setting up roadmaps various projects.

Figure 9:
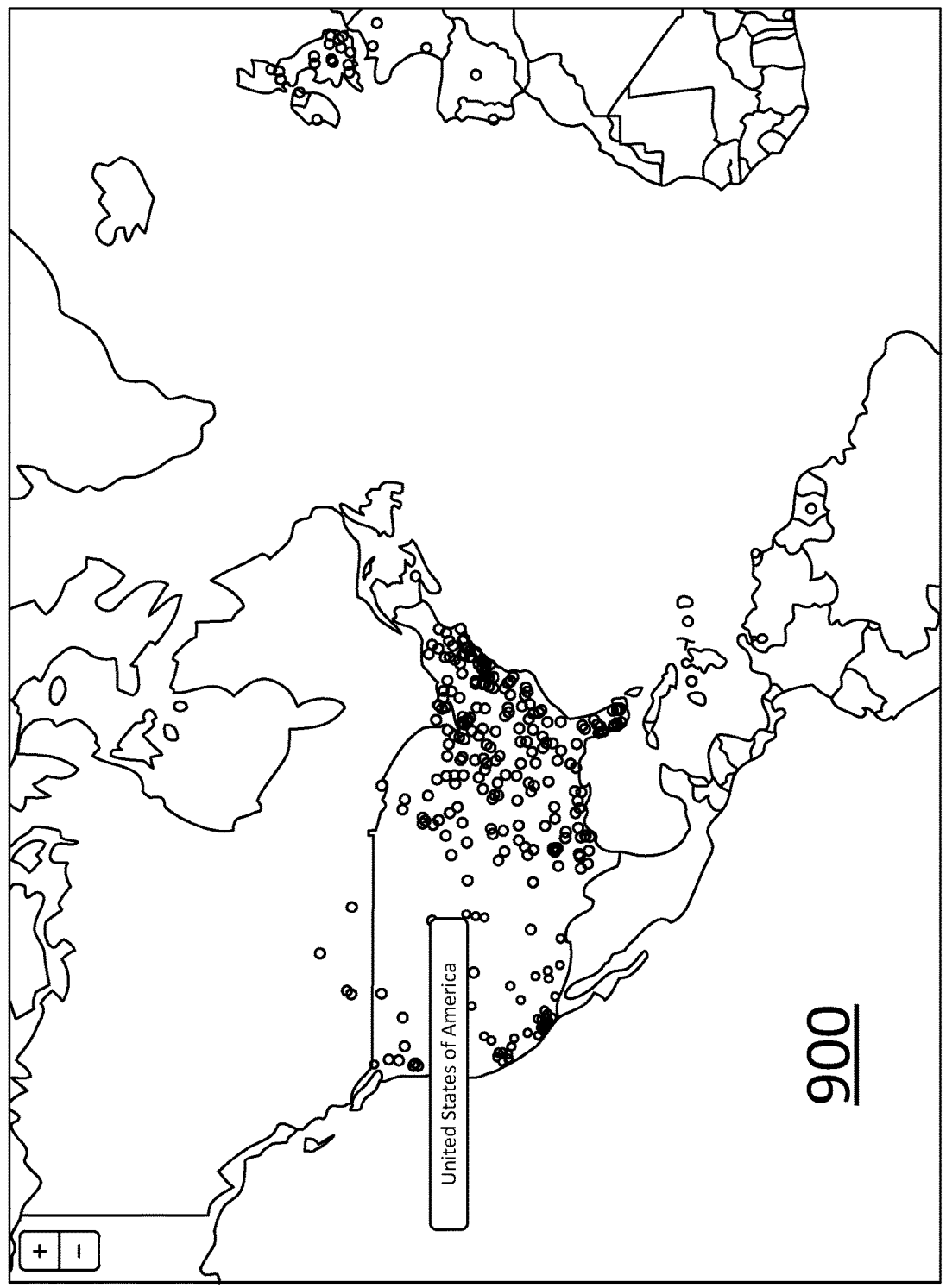
FIG. 9 is an example geographic chart according to examples described herein.

FIG. 9 shows an example Geo Chart (Geographic). A Geo Chart 900 is a component that enables visualization of data that includes a location data in any format such as GPS (Global Positioning System) data. Geo Chart 900 may be a component for visualization of geospatial data.

Geo Chart is designed to be able to visualize data that has geographical location data. It may be used for visualization for example, but not limited to, 1) Allowing visualization of compositions of data in geographical areas using chart-on-chart technology, for example, displaying a Pie Chart, Time Chart, Facet Chart, Net Chart on top of any area of a map. In such examples, data that is shown in sub-charts may be filtered automatically by the geographical region to which the sub-chart is attached to.
2) Alternatively or additionally, multilayer technology lets users toggle the chart point-of-view and select the details that are relevant at any given point in time.
3) Alternatively or additionally, automatic data aggregation and multitude of visualization options enable users to instantly extract information from the raw data that is Important for the End-User.

Input Handling

The systems and methods here include ways for users to interact with the charts and/or graphs on their mobile devices and/or non-mobile client computers and the applications running on them. Such interaction may be limited by the capabilities of the device that the user is utilizing, for example, a high end smartphone may have a touch screen, GPS, voice recognition, motion capture, and a virtual keyboard. Laptops and/or other computing devices may have a mouse pad, touch pad, physical keyboard, touch screen, GPS, etc. The application may receive this input and use it to make requests to the networked server for additional data, use it to render different or changes to charts, and/or manipulate the charts based on the input. Some examples custom input event handling implementation is described below:

Touch inputs may be considered inputs coming from touch-sensitive devices, such as: capacitive touch screens; resistive touch screens; infrared touch screens; other touch screen implementations; where actual touch event is coming from sensory device being interacted with directly or indirectly. Systems and methods here may support different gestures that originate from multiple simultaneous touch events being fired by the input device. Among supported gestures are: pinch-in, pinch-out, scroll left, scroll right, scroll up, scroll down, rotate, pan. Multiple simultaneous gestures are supported such as two parallel rotation events.

Mouse input may be considered, alternatively or additionally, inputs coming from devices such as mouse, track-pad, track-ball, joystick that is connected to the computing device with wire or wirelessly. From a mouse input, the systems and methods here support the following events, for example: Mouse-move; Mouse-in; Mouse-out; Mouse-over; Mouse-move; Mouse-down; Mouse-up; Mouse-click; Mouse-double-click; Mouse-triple-click; Mouse-long-press; and Mouse-scroll up/left/right/down.

The click button such as right-click, left-click, middle-click is distinguished when mouse events is processed.

Keyboard input, may be considered, alternatively or additionally, inputs coming from devices such as keyboard, num-pad and other pads with buttons that are physical or virtual and convert user input into machine code that can be detected with JavaScript. Among supported keyboard events include: Key-down; Key-up; and Key-press.

Alternating states of events are supported by identifying if key events are combined with special keys, such as, "shift", "ctrl", "alt", "command", "option" and/or given the states of "num-lock", "caps-lock", "scroll-lock".

Device orientation and motion, may be considered, alternatively or additionally, input coming through Device orientation API, which results in motion acceleration detection in three axis—X-Axis, Y-Axis, Z-Axis—as well as absolute orientation information.

GPS location, may be considered, alternatively or additionally, input coming through location services API that enables the systems and methods here to use devices current location and motion direction, speed, altitude and precision data to navigate and visual relevant data.

Voice input, may be considered, alternatively or additionally, input coming from device that is capable of recording sound waves originating from any source. Such input is received in waveform digital data which can be processed on the device using voice recognition algorithms to identify the corresponding meaning embedded in the initial recording. On-device or remote decoding technologies can be used interpret the signal. Commands then can be mapped with Navigation, Data, Visualization and/or other components of the systems and methods here to perform requested actions (such as say "zoom In", to perform Navigation call that would "zoom-in" data in the selected chart).

Eye tracking input, may be considered, alternatively or additionally, input coming from device that is capable of recording users pupils and identifying the motion of those. Via triangulation technique it would be possible to determine where the person is looking at thus, following events would become available: Eye-move; Eye-in; Eye-out; Eye-over; Eye-blink; Eye-double-blink; and Eye-triple-blink.

If two or more eyes are tracked then multi-input technology would be available as with multi-touch inputs, enabling eye gesture support such as: Scroll; Rotate; Pinch-in; and Pan.

API input, may be considered, alternatively or additionally, the systems and methods here may use an API that lets programmatically initiate synthetic events of all different input events that are supported in the document. This may open the possibility to transmit input events originating on one device and replicating them on other device(s) given connection between two can be established. Connection can be either real time where input events on one device would be instantly, or in a short time period, simulated on the chart on the selected other device(s) or asynchronous where event replication would enable user to record sequence of events on one device and later re-play that same sequence on any other device has access to a mobile or web application with library integration.

Cross-chart input, may be considered, alternatively or additionally, systems and methods here may be used to produce charts that can interact with other embodiment instances through API, so that when input happens on one chart depending on the resulting state, state update event is dispatched to the linked chart instances. Linked instances would perform the required activity depending on the input event received by the linked chart instance.

Body part motion input. Alternatively or additionally, systems and methods here may be used to create charts that would use the vendor supplied API to access the information about the body parts being moved, and their initial and resulting states. Such input support would enable touch-less interaction with Charts here. Depending on sensors capabilities to identify the actual body parts certain new events would be become available for Navigation, Visualization, Data and other components of proprietary libraries here that would react as defined.

Barometer input. Alternatively or additionally, systems and methods here may be used to create charts that would use API that provides barometer data to the client application. This input could and would be used to affect the state of the Navigation, Visualization or Data.

Temperature input. Alternatively or additionally, systems and methods here may be used to create charts that would use API that provides temperature data to the client application. This input could and would be used to affect the state of the Navigation, Visualization or Data.

Voltage input. Alternatively or additionally, systems and methods here may be used to create charts that would use API that provides voltage data to the client application. This input could and would be used to affect the state of the Navigation, Visualization or Data.

Brainwave input. Alternatively or additionally, systems and methods here may be used to create charts that would use API that provides brainwave information to the client application. This input could and would be used to affect the state of Navigation, Visualization or Data.

Combined input. Alternatively or additionally, systems and methods here may be used to handle such input combinations where input events are coming from different sources simultaneously. Such as, keyboard key-down with mouse click event is combined to augment the default functionality of simple click.

Interactive Data Visualization Examples

Alternatively or additionally, data visualization may refer to a process that takes data points from the source file and causes those data points to be displayed using graphical rendering on an end-user computational device. Interactive data visualization is one example approach described here. In such an interactive example, a user utilizing different human machine interfaces can interact with the mobile computational device to affect which data points are visible on the display at any given point in time and thus affect the final rendered result. As a result of user interaction, the system may cause new data points to be loaded/removed/updated, and thus become visible on the visualization software such as Canvas. Such interaction could affect the data export accordingly.

For example, when a user interacts with an active chart, the system may change the state of the charts by updating the data set that is visible to the user. Visible data state may be defined by a number of navigational parameters that are unique to each chart. For example, a Time Chart may show the visible time range and display unit. For Pie Charts it may be the selected slices and active pies. For Facet Charts it may be the offset on the X axis and active levels of data. For Net Charts it may be the visible nodes, links and visible subview area. For Event Charts it may be the visible time range and zoom level and vertical scroll. For Geo Charts it may be the visible subview, zoomlevel, selected regions. So, when the system responds to user interaction by changing the state of the chart, visible data range may be altered. When data is exported, the visible data is exported, so, when the system changes the subview state in response to a user input, the exported data set may also be affected.

Alternatively or additionally, the library and systems and methods here may be optimized to be used on mobile devices as described above. Such an implementation may have custom human machine-interaction interface implementation to handle various user interactions, such as touch, multi-touch, gyro sensor input, GPS sensor input, eye tracking support, voice control. These inputs may be used to manipulate, view and interact with the charted data.

In order to programmatically integrate with other JavaScript components in a web page or mobile application, the systems and methods here may be built with extensive APIs. Through settings, it may be possible to change any aspect of the charts at any time using appropriate API calls.

For example, through settings it may be possible to change data sources, area settings, series, values, axes, style methods, filter methods, export settings, advanced settings, interaction settings, toolbar settings, legend settings, stack settings, title settings, localization settings, events, info settings, and more as defined in the documentation. This may give a software developer many opportunities to fine-tune and tailor the behavior and the look and feel of a chart made using this technology.

One such example may retrieve and receive data points from the specified source and use a proprietary chart and graph library along with multiple rendering engines that use different algorithms to render data points to a visualization software tool such as Canvas, for example. Such a chart and graph library may be written in JavaScript using HTML 5 as described above.

It should be noted that the engine and library are proprietary and specific to these implementations. Such customization of the internal architecture allows expansion, speed and optimization. Further, the event loop is custom as are the other internal components such as interactivity handling, navigation handling, rendering engines, etc.

Navigation of Charts

Alternatively or additionally, when the system causes a chart and/or graph to be displayed on a display for a user, certain example embodiments allow the user to interact with the chart and/or graph. Certain navigation of the charts and/or graphs may allow a user to display the information a particular way, learn more detailed information about certain aspects of the data, or customize the view. Navigation may also allow users to select view parameters using various input actions. Such actions may be various if the user is utilizing a mobile device. Such devices use gesture recognition as well as GPS input, motion capture, attitude information, etc. to interact.

It may be desirable that the navigation gestures are as natural as possible to minimize learning curve and increase operation efficiency. One way to provide view parameters is in text format, for example by using search field, but systems and methods here may implement navigation using natural manipulation gestures and eliminating text, button and menu based interfaces.

In certain examples, the system may create multiple charts to show different views of the same data. In such an example, navigation by a user while viewing one such chart may trigger a filter in other corresponding charts. Such charts can be either configured to generate such filters by a developer, or it can be performed automatically by the system by analyzing the data structure and what aspects each if it each chart displays.

For example, in a multiple chart example, when the system receives navigation input from a user viewing a particular chart, two things may happen: 1. The subview of the chart may be changed based on the input. 2. A new filter may be introduced, a filter is changed or a filter is canceled. Concurrently, other charts may be updated to show data according to the new filter set through integration of bibox or without it. Bibox may refer to a business intelligence component that enables cross-chart data filtering from multiple data sources.

Certain example navigation interactions and input may include, but are not limited to:

—scrolling—charts that represent linear ordering of items may be scrolled. The scrolling may result in: the chart view changing to show adjacent data, and/or filters for other charts updated.

Examples of interactions to initiate include but are not limited by, dragging a mouse, finger scroll, stylus scroll, etc. over the chart in scroll direction, clicking and/or tapping on designated scroll areas, and/or tilting the device and affecting the embedded motion sensors.

Alternatively or additionally, —zoom in/out—when data is visualized along a continuous axis, such as on a Time chart, Geo chart, etc., the visualized graphic may be allowed to be displayed by zooming in and out. Zooming may change the filters for other charts in a similar way to scroll filtering to the currently visible section of the chart. Zooming may be conducted by tapping or clicking buttons, and/or pinching with fingers or thumb and finger on a touchscreen.

Alternatively or additionally, —legend—legend may show descriptions of various lines and symbols displayed in a particular chart. By interacting with legend items a filter can be triggered that may hide the category the legend symbol depicts. Several actions can be bound to a legend. One action can hide/show the interacted category. Another action can hide all other categories, leaving just the one acted upon.

Alternatively or additionally, —drilldown—when aggregation is used, interaction with an item such as a click, tap, or similar, may trigger a drill-down action. A drill-down may in turn trigger a new filter to show only the category the aggregated item represents and shows next configured drill-down level in the chart the drill-down is performed.

Alternatively or additionally, —drillup—this example action may be thought of as opposite to a drill-down. Drill-up reverts the view and filter changes added by drill-down. A drill-up is usually triggered by interacting with a special button or action area.

Alternatively or additionally, —expanding—when working with linked data which can be represented as nodes and links, another navigation method may be to expand nodes to show nodes that are directly connected to with links. Expanding may introduce new nodes into the view. Expanding may also be used in and with filters. For example, in a Network chart where each node represents a category, all visible nodes can represent a filter of few categories.

Alternatively or additionally, —selection—selection may be an alternate way of introducing a filter without changing the view. By selecting several items or a range on an axis a filter is introduced corresponding to the selection. Selection may be by click or tap or similar.

Styling

In certain example embodiments, in order to provide depth to a visual graphic, different options may be used to display chart items. An item could be any item depicted in a chart and/or graph, for example, a data point, a pie chart wedge, a line, a column, etc. Each chart may have a default style for the items displayed in it. Systems and methods here may use style functions to allow an application developer to dynamically adjust the appearance of each item.

Further, an item may have various fields that represent the item state in a given chart or graph. Such state fields may include:

data—item data as received from database
hovered—if item is hovered, something is displayed
series—item series
selected—if item is selected, something is displayed
focused—if item is focused—by double-clicking/double-tapping on it The style functions can use these item state fields to compute item style fields. Every time one of the state fields is changed, the style function may be called to compute updated visual style.

Examples of customizations may include style field choices such as, but not limited to: item color; item fill color; item opacity, item label, item shadow, item color, offset, and blur. Sub items may also be used.

This allows simple style function definition without the need for the developer to track the item state or update style by reacting to chart events.

Chart API

To simplify API access, systems and methods here may use only settings and navigation functions. The exposed object model may be limited to only chart items. All other aspects may be configured via simple JavaScript objects (settings), isolating the application developer from chart internal structures and states.

To create a chart, the client application may construct a JavaScript object containing settings, based on documented structure. Most of the fields in the object may be optional and default values may be used when not provided.

After the chart is created the client application can call chart.updateSettings method with new settings object containing new values for the settings fields application wants to change. The chart may analyze the new values and reconfigures the chart to match the settings. Navigation state is a notable exception to this rule and may be set/read via API commands.

Work Scheduling

Chart state updating may tax a mobile device processor. Also, repeated updating without subsequent rendering a chart may waste resources. To help alleviate this, systems and methods here may queue all the chart changes and defer the updating until just before actual paint/render operation is performed. In such examples, the only operation that is performed synchronously is navigation state tracking.

The chart changes may be stored in a changes object. An internal notifyChanges call may be issued with a changes object. If multiple notifyChanges calls are made, the changes objects may be merged together to form a union of all changes. If one value is changed multiple times, the latest value may take precedence. Also, if a list of modified objects is accumulated, each notifyChanges call adds items to the list, eliminating duplicates.

A changes processing order is defined in each chart that guarantees correct final state, regardless of the order changes have been initially notified.

Such architecture results in very little processing needed when API calls are being made, eliminating application development pitfalls when expensive update calls are made in tight loops.

Implementation Examples

Systems and methods disclosed here may utilize chart and graph libraries which may enable software developers to add interactive charts to their web and mobile applications. Certain example embodiments may employ HTML5, for example, as a basis for further development of new charting libraries, including the use of CANVAS in some embodiments for actual renderings of charts. Other examples may utilize any other kind of software implementation such as but not limited to SVG and WML. Further, such a library may be used with mobile devices of all sorts. Such examples may use a custom layer within the library which would be responsible for handling all the human-machine interaction, such as, touch, multi-touch, tap, tilt, GPS (global positioning system) and other sensory data support.

As JavaScript may be used as the programming language in which to develop the systems and methods here, such a library may be cross-device and cross-platform compatible as long as the target device has a support for both JavaScript code execution and Canvas API (application program interface) for actual data visualization.

Figure 10:
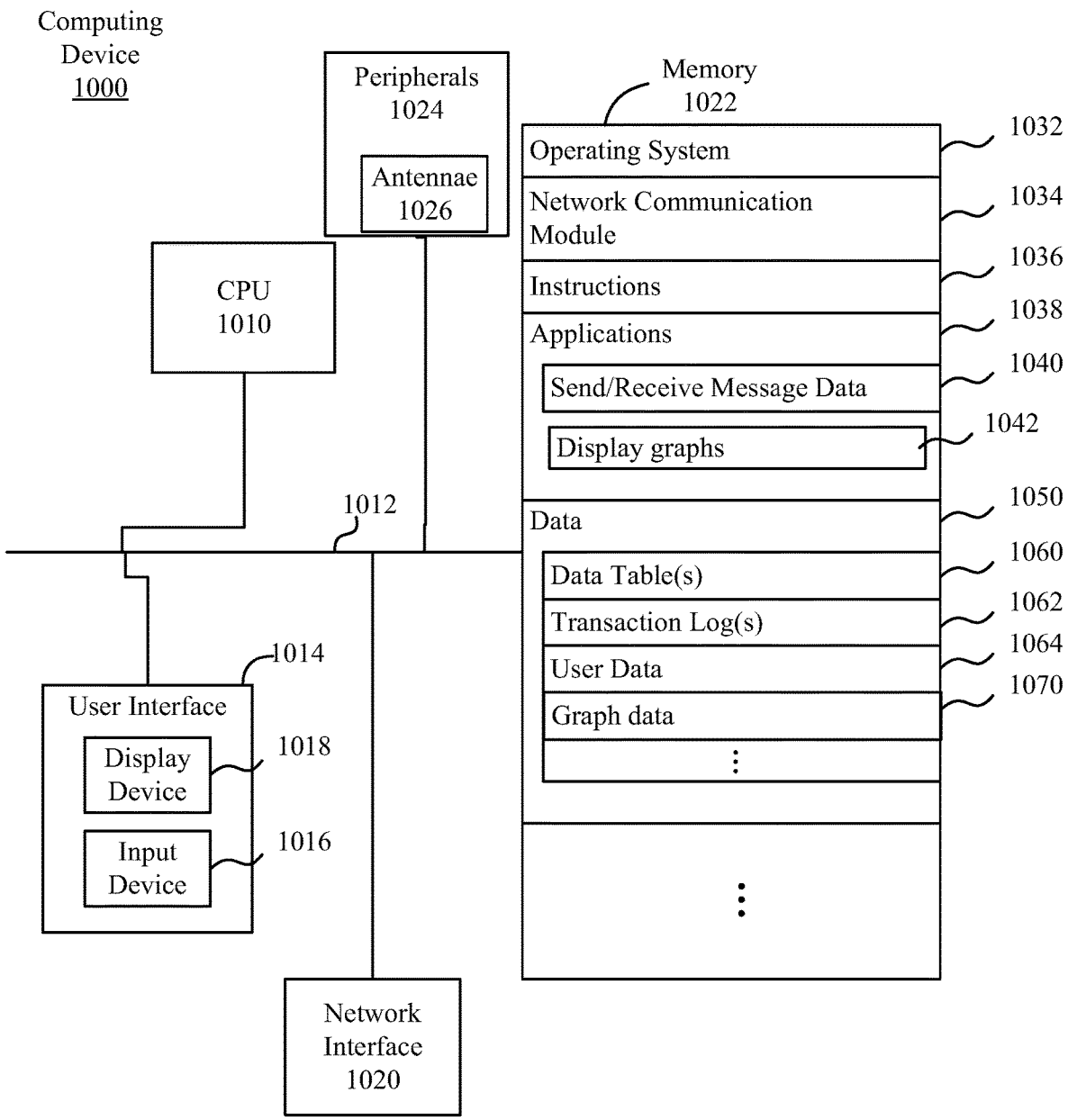
FIG. 10 is an example computing system used to practice the examples described herein.

FIG. 10 shows an example computing device that may be used to implement some or all of the example embodiments described here. In the example computing device 1000 a CPU 1010 is shown in communication with a bus 1012 or other networking communication path with a user interface 1014. The user interface 1014 is shown with a display device 1018 and an input device 1016. Depending on the computing device 1000 this could be a smartphone screen with touch enabled input. In some embodiments, it may be a keyboard, virtual keyboard, mouse, gesture recognition cameras, etc. A network interface 1020 is also shown in communication with the CPU 1010. The network interface may allow the computing device 1000 to communicate over a network such as but not limited to the internet, a cellular network, a WiFi network, etc. The computing device 1000 is also shown with various peripherals 1024 such as but not limited to an antennae 1026. Also shown in the example is a memory 1022. The memory 1022 is shown running an operating system 1032 with a network communication module 1034, instruction 1036, applications such as send/receive data 1040 and display graphs 1042. Also shown is a data module 1050 with data tables 1060, transaction logs 1062, user data 1064 and graph data 10170 shown stored on it.

The computing device 1000 of FIG. 10 could also be a server, distributed computer, or any other kind of computing device capable of processing data, storing data, causing storage of data, or other computing features to execute the methods described here.

CONCLUSION

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The computer may be a personal computer or other type of work station or terminal device. The structure, programming and general operation of such computer equipment and as a result the drawings is generally well known. The hardware elements, operating systems and programming languages of such equipment are conventional in nature.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications.

Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM, a EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Accordingly, the specification and FIG.s associated with these embodiments are to be regarded in an illustrative rather than a restrictive sense, and all modifications are intended to be included within the scope of the claims described below. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The disclosures herein may be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The software may be stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

What is claimed is:

1. A method comprising:
   at an application running on a mobile device with data storage, the application in communication with a network and a server, receiving a user request from a user;
   at the application, in response to receiving the user request, sending a data request for data to the server over the network;
   at the application, receiving a subset of the requested data from the server;
   at the application, causing storage of the received subset of requested data on the data storage of the mobile device;
   at the application, using the stored subset of requested data to render a first chart for display on the mobile device;
   at the application, sending a request for data updates to the server over the network to update the rendered first chart,
      wherein the request for data updates includes a limit parameter for the requested data updates;
   at the application, receiving a data update from the server, wherein the data in the data update includes data matching the limit parameter for the requested data update;
   at the application, using the received data update to update the first chart for display on the mobile device;
   at the application, receiving input from the user regarding the rendered first chart;
   at the application, as the rendered first chart is interacted with by the user on the mobile device, queuing chart changes as they are received;
   deferring updating the first chart until a predetermined time before the first chart is rerendered;
   at the application, using the received data update to render a second chart, wherein the second chart is a different type of chart than the first chart;
   receiving navigation input from the user in the first chart while the second rendered chart is displayed, introducing a filter action in a second chart based on the input in the first chart.

2. The method of claim 1 further comprising,
   at the application, determining additional data related to the stored subset of requested data including sub-view filtering;
      at the application, causing storage of the determined additional data; and
      at the application, using the determined additional data to update the rendered chart.

3. The method of claim 1 wherein the limit parameter allows organization of a local data cache.

4. The method of claim 1 wherein the limit parameter allows data requests from a previous request.

5. The method of claim 1 wherein the limit parameter allows for linked charts to share limit parameters and use them for cross-chart filtering.

6. The method of claim 1 wherein the limit parameter is a timestamp range.

7. The method of claim 6 wherein the timestamp range limit parameter is used to start forming request limits.

8. The method of claim 1 further comprising, sharing parameters among linked charts including filtering data.

9. The method of claim 8 wherein the filtering is time filtering.

10. The method of claim 1 wherein the chart is one of a pie chart and a facet chart.

11. The method of claim 1 wherein the chart is one of a time chart, a network chart, a geography chart, and an event chart.

12. The method of claim 1 wherein the filter action is one of: introduction of a new filter, changing a filter, or cancelling a filter.

13. The method of claim 1 wherein the filter action is changing a subview of the second chart.

* * * * *